United States Patent
Otsuka

(10) Patent No.: US 8,113,576 B2
(45) Date of Patent: Feb. 14, 2012

(54) CABLE CONNECTING DEVICES

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 353 days.

(21) Appl. No.: 12/426,540

(22) Filed: Apr. 20, 2009

(65) Prior Publication Data

US 2009/0267389 A1 Oct. 29, 2009

(30) Foreign Application Priority Data

Apr. 24, 2008 (JP) ................................. 2008-113874

(51) Int. Cl.
*B60N 2/42* (2006.01)
(52) U.S. Cl. ................................. 297/216.12; 297/217.2
(58) Field of Classification Search ............ 297/216.12, 297/391, 408, 217.2
See application file for complete search history.

(56) References Cited

U.S. PATENT DOCUMENTS

| | | | | |
|---|---|---|---|---|
| 5,823,619 A | * | 10/1998 | Heilig et al. | 297/216.12 |
| 2002/0074843 A1 | * | 6/2002 | Malsch et al. | 297/408 |
| 2006/0202524 A1 | * | 9/2006 | Yamaguchi | 297/216.12 |
| 2009/0051202 A1 | | 2/2009 | Ozeki et al. | |
| 2009/0102266 A1 | | 4/2009 | Furukawa et al. | |
| 2009/0126520 A1 | | 5/2009 | Yamaguchi et al. | |
| 2009/0134683 A1 | * | 5/2009 | Furukawa et al. | 297/391 |
| 2009/0250981 A1 | * | 10/2009 | Matsui | 297/216.12 |
| 2009/0315370 A1 | * | 12/2009 | Hartlaub | 297/216.12 |
| 2009/0315371 A1 | * | 12/2009 | Shimizu et al. | 297/216.12 |

FOREIGN PATENT DOCUMENTS

| | | |
|---|---|---|
| EP | 2058534 | 5/2009 |
| WO | 2008/026362 | 3/2008 |

* cited by examiner

*Primary Examiner* — Peter R. Brown
(74) *Attorney, Agent, or Firm* — Greenblum & Bernstein P.L.C.

(57) ABSTRACT

One aspect according to the invention can include a cable connecting device including a first cable and a second cable coupled to a first mechanism and a second mechanism of a vehicle seat, respectively, and each having an inner cable member and an outer cable member. A cable receiving member can receive end portions of the first cable and the second cable. A coupling mechanism can coupling the inner cable member of the first cable and the outer cable member of the second cable to each other within the cable receiving member. A recognition enabling device enables recognition of a coupling condition between the inner cable member of the first cable and the outer cable member of the second cable during an operation for coupling by the coupling mechanism.

13 Claims, 14 Drawing Sheets

CABLE CONNECTING DEVICES

This application claims priority to Japanese patent application serial number 2008-113874, the contents of which are incorporated herein by reference.

BACKGROUND OF THE INVENTION

1. Technical Field

The present invention relates to cable connecting devices for connecting two different mechanisms of a vehicle seat via a cable for transmitting a mechanical operation amount from one to the other of the mechanisms such that the mechanisms are interlocked with each other. The two different mechanisms may be a mechanism disposed within a seatback of the vehicle seat and a mechanism disposed within a headrest positioned on an upper side of the seatback.

2. Description of the Related Art

WO20081026362 in the name of the same assignee as the present application discloses a cable connecting device including a cable serving as a mechanical operation amount transmitting device. The contents of WO2008/026362 are incorporated herein by reference. According to this publication, the cable includes a first cable routed within a seatback, and a second cable connected to the first cable in an axial direction and routed within a headrest. Each of the first and second cables has a double cable structure, in which a linear inner member is axially movably inserted into a tubular outer member. The second cable is routed within a tubular stay extending downwardly from the headrest, so that the stay serves as an outer member of the second cable. The stay is inserted into a tubular support disposed on the upper side of the seatback. A connecting end portion of the inner member of the first cable has an engaging projection that extends radially outward. Insertion slots are formed in the support and permit the engaging projection to extend therethrough and to move relative thereto in an axial direction. Receiving slots are formed in a connecting end portion of the stay and can receive the engaging projection of the inner member of the first cable in the axial direction. By inserting the connecting end portion of the first cable into the support from its lower side and engaging the engaging projection with terminal ends of the insertion slots formed in the support, the first cable can be brought to a state where the first cable is held to be suspended within the support. Then, the stay is inserted into the support from above and the outer member of the first cable is inserted into the stay, so that engaging projection engaging with the terminal ends of the insertion slots of the support is guided to move into the receiving slots formed in the stay. Therefore, with a head portion of the outer member of the first cable positioned proximal to the lower end of the inner member of the second cable, the inner member of the first cable and the stay engages to be connected to each other while they are permitted to move relative to each other in the axial direction by a distance.

Each of the insertion slots formed in the support has a configuration curved in one of opposite circumferential directions, while each of the receiving slots formed in the stay has a configuration curved in the other of the opposite circumferential directions. Therefore, as the engaging projection of the connecting end of the inner member of the first cable is guided to be moved from the position engaging with the terminal ends of the insertion slots formed in the support into the receiving slots of the stay, the inner member of the first cable rotates in the other direction in order to move the engaging projection from the terminal ends of the inserting slots to the terminal ends of the receiving slots. The headrest can be held at a mounted position by pressing the stay further downward relative to the support in the state where the first and second cables are connected to each other.

In the state where the engaging projection is engaged with the terminal ends of the insertion slots of the support and the first cable is held to be suspended within the support, the head portion of the outer member of the first cable is positioned within the support.

As described above, in order to connect the first and second cables to each other, the engaging projection of the first cable is first brought to engage with the insertion slots for suspending the first cable within the support. Then, the stay is inserted into the support, so that the engaging projection is disengaged from the insertion slots and is guided to move into the receiving slots for achieving connection between the first cable and the second cable. However, if the engaging projection is not in engagement with the terminal ends of the insertion slots even in the state where the first cable is suspended within the support, or if the insertion slots or the receiving slots are not formed at suitable positions, the engaging projection may not be guided to be smoothly move from the insertion slots to the receiving slots. In such a case, the engaging projection may be disengaged from the insertion slots before it moves into the receiving slots. Therefore, there is a possibility that the first cable falls off the support. Because the first cable is positioned within the seatback, it is not possible to visually recognize from the outer side as to whether or not the first cable has fallen off the support. In addition, because the first and second cables are connected to each other within the support that is embedded into the seatback, it is also not possible to visually recognize from the outer side as to whether or not the first and second cables are connected to each other.

Because the connecting condition between the first cable and the second cable cannot be visually recognized from the outer side, it has been assumed that the first cable and the second cable are connected to each other by the function of the connecting device in so far as the stay is inserted to be held within the headrest. Therefore, it has not been possible to reliably ensure the quality and the function of the vehicle seat. Thus, if the first cable and the second cable are not connected to each other, it is not possible to interlock between the mechanism disposed within the seatback and the mechanism disposed within the headrest via the cable.

Thus, there is a need in the art for a cable connecting device that enables to visually recognize from an outer side a connecting condition between a first cable and a second cable.

SUMMARY OF THE INVENTION

One aspect according to the invention can include a cable connecting device including a first cable and a second cable coupled to a first mechanism and a second mechanism of a vehicle seat, respectively. Each of the first and second cables has an inner cable member and an outer cable member. A cable receiving member can receive end portions of the first cable and the second cable. A coupling mechanism can couple the inner cable member of the first cable and the outer cable member of the second cable to each other within the cable receiving member. A recognition enabling device enables recognition of a coupling condition between the inner cable member of the first cable and the outer cable member of the second cable during an operation for coupling by the coupling mechanism.

DETAILED DESCRIPTION OF THE INVASION

Figure 1:
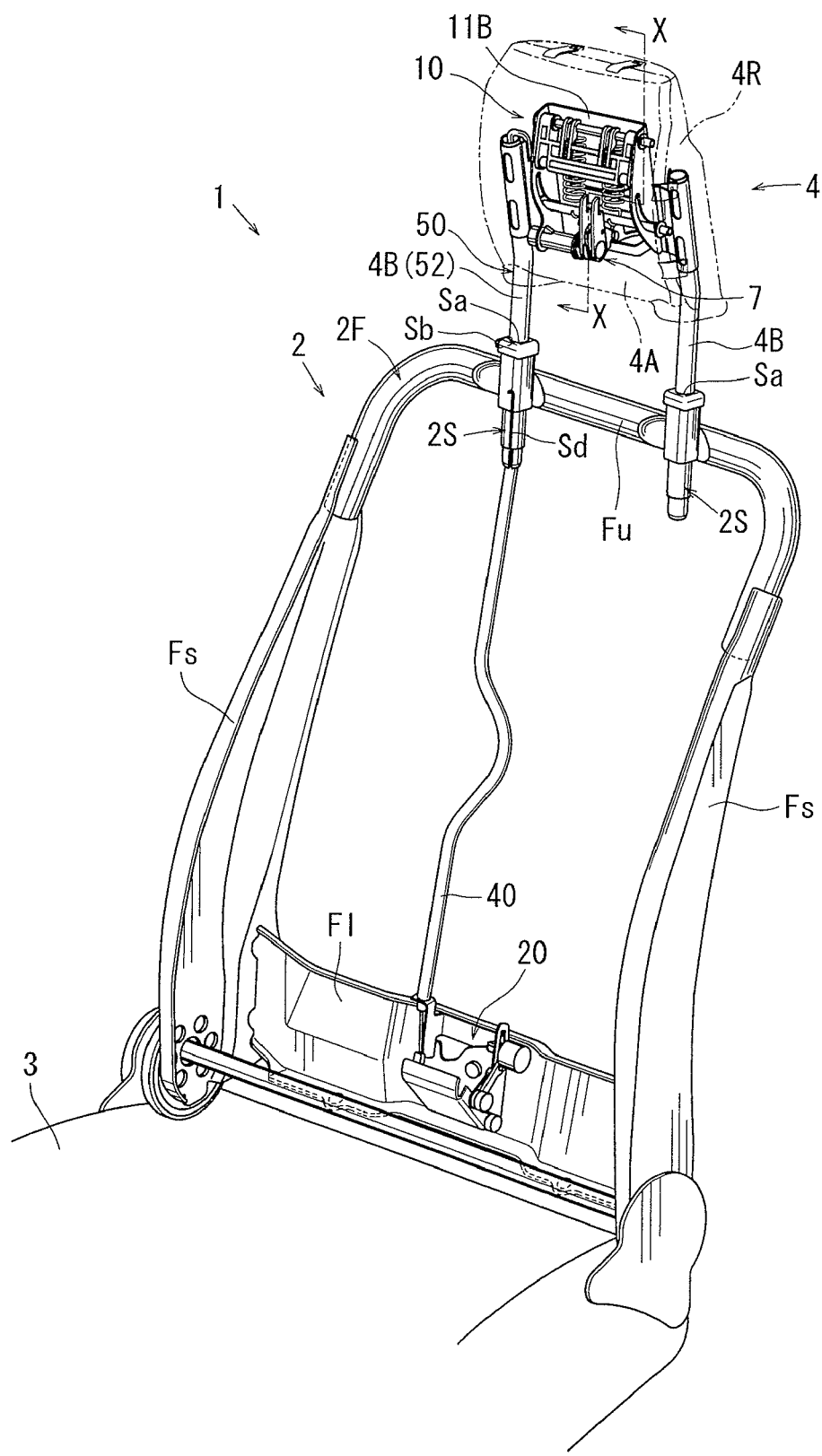
FIG. 1 is a perspective view showing an internal structure of a vehicle seat incorporating a cable connecting device according to an embodiment of the present invention.

Each of the additional features and teachings disclosed above and below may be utilized separately or in conjunction with other features and teachings to provide improved cable connecting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a cable connecting device is configured to connect a first mechanism and a second mechanism via a cable for enabling the first mechanism and the second mechanism to be interlocked with each other. The first mechanism is disposed within a seatback of a vehicle seat, and the second mechanism is disposed within a headrest positioned on an upper side of the seatback. The connecting device may include a first cable and a second cable. The first cable is coupled to the first mechanism. The second cable is coupled to the second mechanism. Each of the first and second cables includes a linear inner member and a tubular outer member. The inner member is inserted into the outer member and can move relative to the outer member in an axial direction. The cable connecting device further includes a tubular support disposed on an upper side of the seatback and a tubular stay extending downward from the headrest and capable of being inserted into the support. The outer member of the second cable is the tubular stay, so that the inner member of the second cable can be inserted into the tubular stay. The inner member of the first cable has a connecting end with an engaging projection extending radially outward. The support includes an insertion slot permitting the engaging projection to extend radially outward through the insertion slot and to move in an axial direction along the insertion slot. The stay has a connecting end including a receiving slot capable of receiving the engaging projection in the axial direction. The inner member of the first cable can be connected to the stay by (a) inserting the first cable into the support from the lower side, engaging the engaging projection of the inner member with the insertion slot of the support, and positioning the engaging projection at a terminal end of the insertion slot, so that the first cable can be held by the support in a suspended manner within the support; and (b) inserting the stay into the support from the upper side for receiving the outer member of the first cable within the stay, so that (i) the engaging projection positioned at the terminal end of the insertion slot of the support is transferred to move into the receiving slot formed in the stay, (ii) the inner member of the first cable is connected to the stay via the engaging projection so as to be capable of moving relative to the stay within a predetermined distance in the axial direction, and (iii) an upper end of the outer member of the first cable is positioned to be proximal to a lower end of the inner member of the second cable. When the first cable is held by the support in a suspended manner within the support, the upper end of the outer member of the first cable extends upward from an upper surface of the support. A view window is formed in a circumferential wall of the stay and positioned to be opposed to the lower end of the inner member of the second cable, so that the inside of the stay can be viewed through the view window.

An embodiment of the present invention will now be descried with reference to FIGS. 1 to 14. This embodiment relates to a cable connecting device for connecting a headrest moving mechanism 10 and a detection mechanism 20 to each other via a first cable 40 and a second cable 50. The heat rest moving mechanism 10 is operable to move a support 4A of a headrest 4 rearwardly to a position proximal to a head of a passenger who is seated on a vehicle seat 1 of a vehicle when collision of another vehicle with a rear portion of the vehicle having the vehicle seat 1 (hereinafter simply called "backside collision") occurs. The detection mechanism 20 can detect a leaning load that may be applied by the passenger when the backside collision occurs.

The vehicle seat 1 can be installed on a vehicle, such as an automobile, and includes a seatback 2 serving as a back support, a seat cushion 3 serving as a seat, and the headrest 4 serving as a head support. For the purpose of easy understanding of the device of the seat 1, only the internal devices of the seatback 2 and the headrest 4 are shown in the drawings.

The headrest 4 has right and left rod-like stays 4B extending vertically downward from the headrest 4. The stays 4B are mounted to the upper portion of the seatback 2 by inserting the stays 4B into insertion holes 5a formed within right and left tubular supports 2S, respectively. More specifically, the supports 2S are fixedly attached to an upper frame Fu constituting an upper arm of a back frame 2F. The back frame 2F serves as a framework of the seatback 2. The headrest 4 is normally held at a predetermined position for supporting a head of a passenger seated on the vehicle seat 1 from the backside of the head when no backside collision occurs. When backside collision occurs, the support 4A positioned on the front side for supporting the head of the passenger can instantaneously move forwardly and upwardly. Thus, when the backside collision occurs, the passenger may take a posture of shifting his or her body forwardly and upwardly relative to the seat cushion 3. Therefore, the support 4A is moved forwardly upwardly to reach a position right behind the head of the passenger. Hence, it is possible to prevent the head of the passenger from excessively inclining rearwardly when the backside collision occurs. As a result, it is possible to reduce or minimize a load applied to a neck of the passenger and to eventually reduce or minimize a risk of suffering from a whiplash injury.

The forward and upward movement of the support 4A of the headrest 4 is caused by the headrest moving mechanism 10 assembled within the headrest 4. When no collision occurs, the headrest moving mechanism 10 holds the support 4A at a rearward position or an initial position (see FIG. 10), where the support 4A is prevented from moving forwardly upwardly. When the backside collision occurs, the headrest moving mechanism 10 releases the restriction of movement of the support 4A and moves the support 4A forwardly upwardly (see FIG. 13) to a collision accommodating position, where the support 4A can be positioned right behind the head of the passenger. The support 4A positioned at the collision accommodating position may not be pushed back by the load of the head of the passenger that may be applied by the movement of the head inclining rearwardly when the backside collision occurs.

The operation for releasing the restriction of movement of the support 4A is performed by way of a transmitting device for transmitting a mechanical operation amount. The transmitting device is coupled to a detecting device 20 disposed within the seatback 2. The detecting device 20 can detect the leaning load applied by the passenger when backside collision occurs. In this embodiment, the transmitting device includes the first cable 40 and the second cable 50. The first cable 40 is routed within the seatback 2 and has a lower end connected to the detecting device 20. The second cable 50 is routed within the headrest 4 and has an upper end connected to the headrest moving mechanism 10. An upper end of the first cable 40 is connected to a lower end of the second cable 50.

Figure 2:
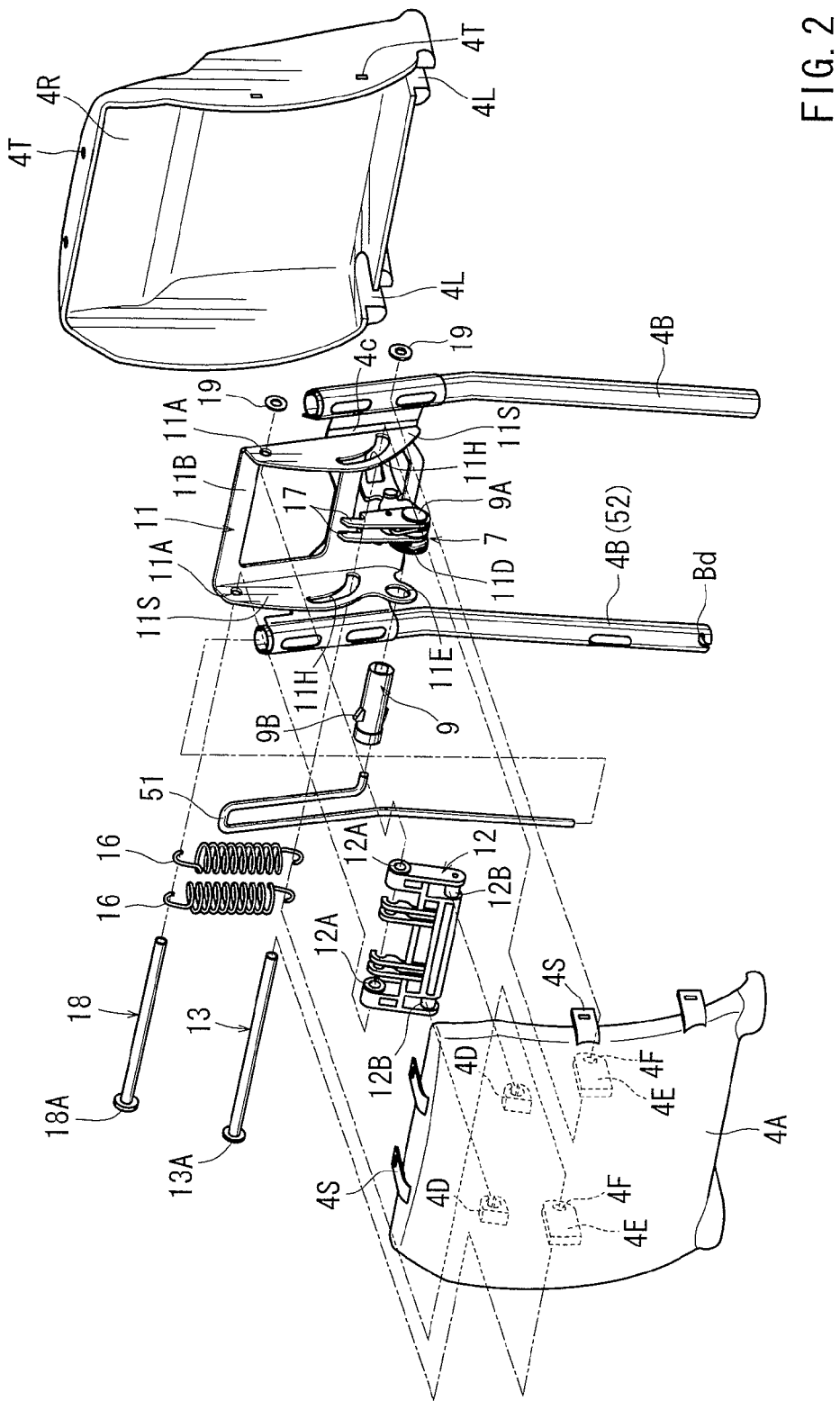
FIG. 2 is an exploded perspective view of a headrest moving mechanism of the vehicle seat.
Figure 10:
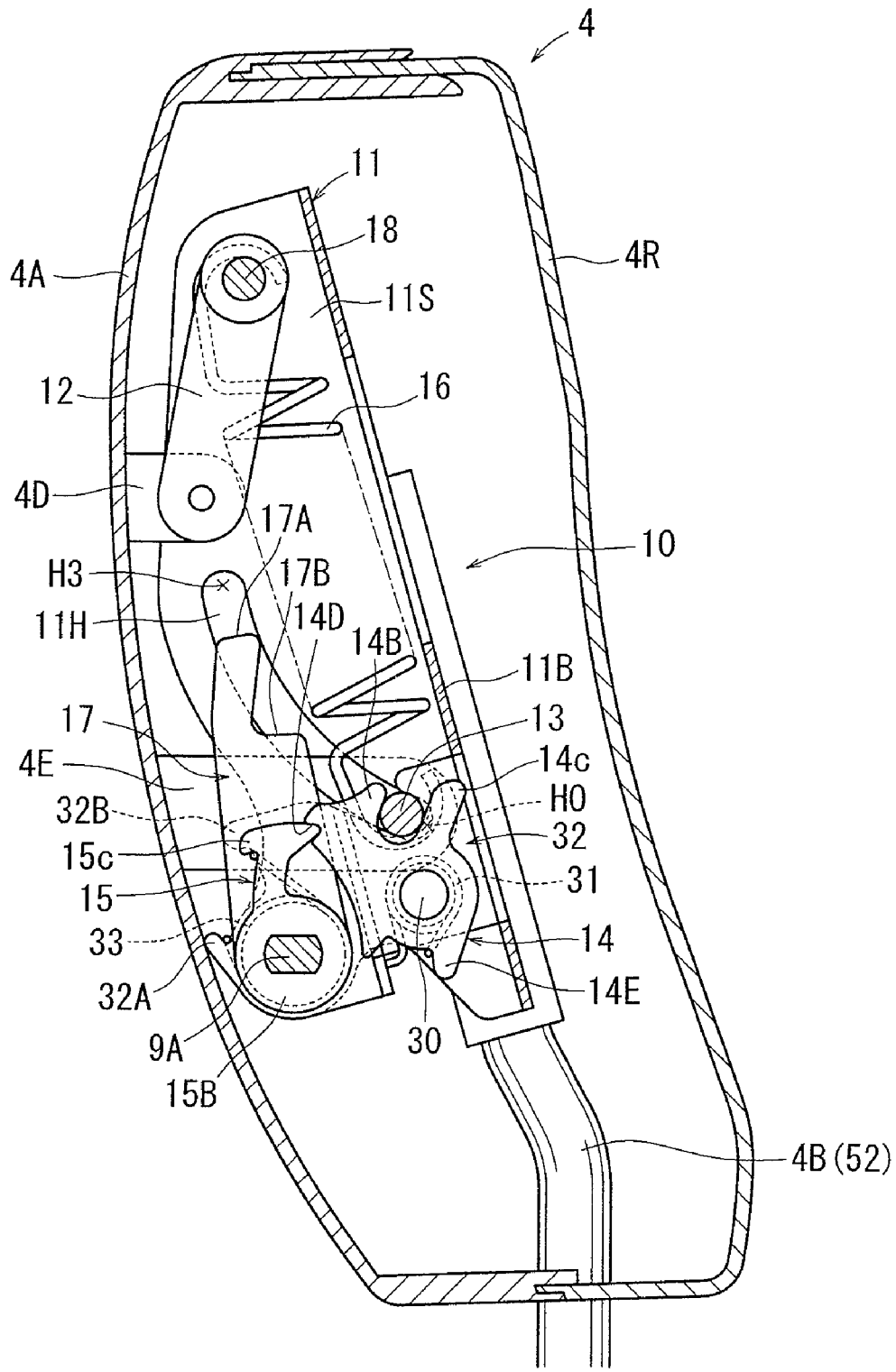
FIG. 10 is a cross sectional view taken along line X-X in FIG. 1.
Figure 11:
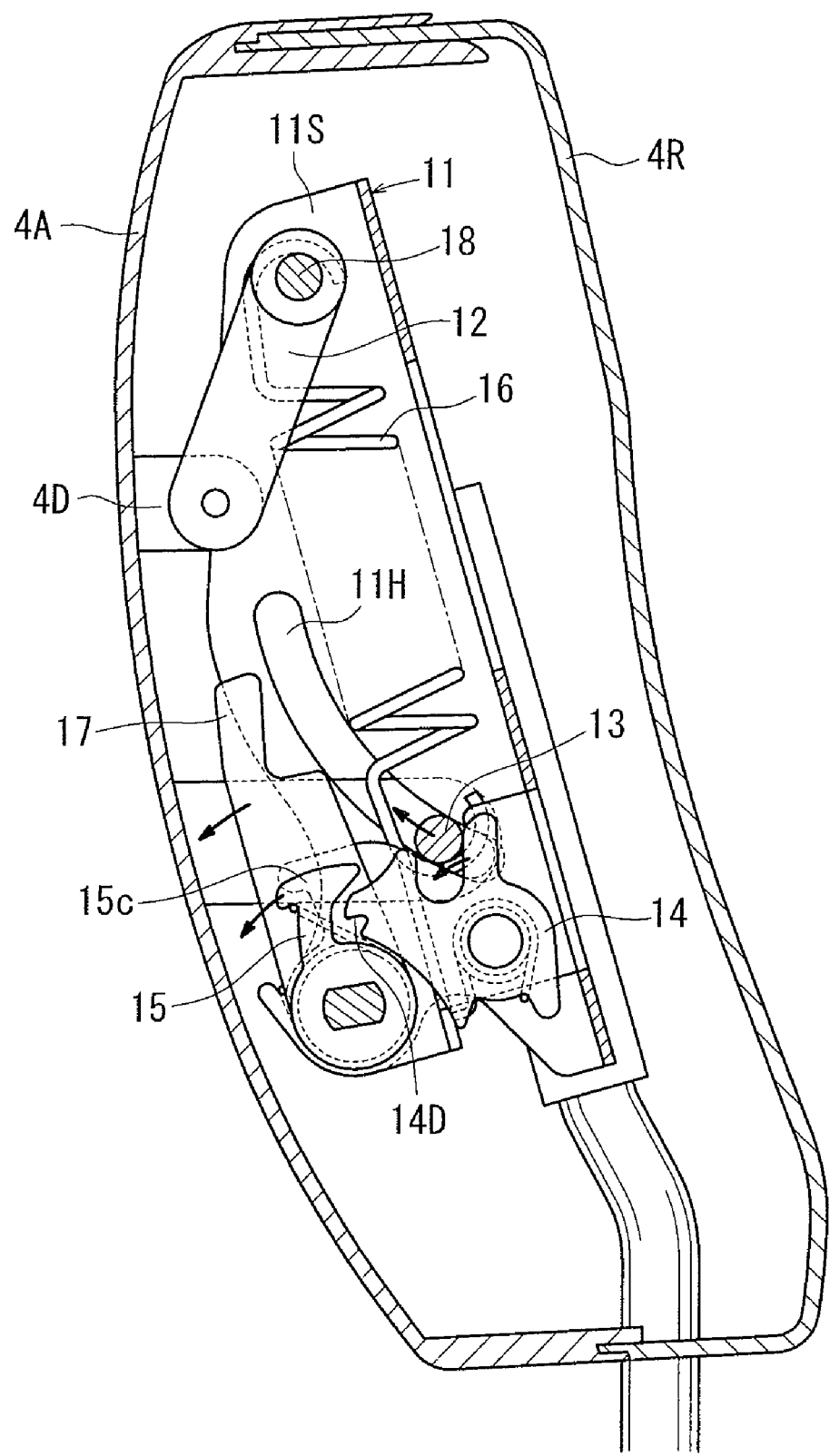
FIG. 11 is a view similar to FIG. 10 but showing the state where a lock device for holding an engaging pin has been released.

As shown in FIGS. 2 and 10, the headrest moving mechanism 10 includes a base 11 connected to and between the two stays 4B, a link member 12 pivotally connected to and between the support 4A and the base 11 to permit pivotal movement of the support 4A relative to the base 11, an engaging pin 13 fixedly mounted to the support 4A for positioning the support 4A as the support 4A pivots due to the connection by the link member 12, a lock device 7 locking the engaging pin 13 at an initial position when no backside collision occurs, a tension spring 16 for normally biasing the engaging pin 13 toward a collision accommodating position, and restricting plates 17 for restricting the movement of the engaging pin 13 to return to the initial position when the backside collision occurs.

The base 11 is made of synthetic resin and is molded into one piece. The base 11 includes a rear plate portion 11B, a bearing ring 11D mounted to the rear plate portion 11B at a position forwardly of the rear end of the rear plate portion 11B, and a pair of side plate portions 11S extending forwardly from the right and left edges of the rear plate portion 11B. By means of screws (not shown), the base 11 is fixedly attached to a connecting plate 4C extending between the stays 4B. Each of the stays 4B has a tubular configuration and has open upper and lower ends. An inner member 51 of the second cable 50 is inserted into one of the stays 4B from its upper opening. Each of the stays 4B has an upper portion bent to be inclined relative to the remaining portion. The side plate portions 11 have elongated slots 11H for guiding the opposite ends of the engaging pin 13. Each of the elongated slots 11H has an arc-shaped configuration to enable movement of the support 4a forwardly upwardly from the initial position taken before the occurrence of the backside collision to the collision accommodating position.

The link member 12 made of synthetic resin and is molded into one piece. The link member 12 is positioned between the right and left side plate portions 11S for link-connection between the upper portion of the base 11 and the back surface of the support 4A. More specifically, connecting holes 12A are formed in right and left side parts of an upper portion of the link member 12 and extend therethrough. Similarly, connecting holes 11A are formed in the upper portions of the right and left side plate portions 11S of the base 11. A connecting rod 18 having a length greater than the width in right and left directions of the base 11 is inserted into the connecting holes 11A and 12A, so that the link member 12 is connected to the base 11 so as to be pivotable about the connecting rod 18. The diameter of the connecting holes 11A and the diameter of the connecting holes 12A are set to be substantially equal to each other. A head 18A having a diameter larger than the inner diameter of the connecting holes 12A is formed integrally with one end of the connecting rod 18. A fixing ring 19 having a diameter larger than the inner diameter of the connecting holes 12A is fitted onto the other end of the connecting rod 18. Therefore, the connecting rod 18 is prevented from being removed from the connecting holes 11A and 12A. Left and right strikers 12B are formed on the left and right parts of the front portion of the link member 12, respectively. Left and right hooks 4D are formed on the left and right parts of the rear upper portion of the link member 12, respectively, and protrude rearwardly therefrom. The left and right hooks 4D engage with the corresponding left and right strikers 12B, so that the link member 12 is pivotally connected to the support 4A.

The engaging pin 13 has a length longer than the width in left and right directions of the base 11 and is inserted into the elongated slots 11H of the base 11 and into connecting holes 4F formed in front ends of left and right connecting arms 4E. The left and right connecting arms 4E are formed integrally with the support 4A and protrude rearwardly from left and right sides parts of an intermediate portion with respect to the vertical direction of the back surface of the support 4A. The width of the elongated slots 11H and the diameter of the connecting holes 4F are set to be substantially equal to each other. Therefore, during the forward and upward movement of the support 4A that may be caused when the backside collision occurs, the engaging pin 13 slidably moves along the elongated slots 11H and the connecting arms 4E pivot about the engaging pin 13 to position the support 4A. Here, the left and right connecting arms 4E are positioned on the outer sides of the left and right side plate portions 11S, respectively. Ahead portion 13A having a large diameter than the diameter of the connecting holes 4F is formed integrally with one end of the engaging pin 13. A fixing ring 19 having a diameter larger than the diameter of the connecting holes 4F is fitted onto the other end of the engaging pin 13, so that the engaging pin 13 is prevented from being removed from the elongated holes 11H and the connecting holes 4F. The engaging pin 13 extends parallel to the connecting rod 18. Left and right tension springs 16 are hooked to and between the engaging pin 13 and the connecting rod 18, so that the tension springs 16 bias the engaging pin 13 and the connecting rod 18 toward each other. Therefore, the engaging pin 13 is urged toward upper ends H3 of the elongated slots 11H, while it may be positioned at lower ends H0 of the elongated slots 11H when no biasing force is applied.

As shown in FIG. 10, the lock device 7 includes a hook 14 and a lock lever 15. The hook 14 can engage the engaging pin 13 for holding it at an initial position. The lock lever 15 is operable to lock and unlock the engagement of the engaging pin 13 with the hook 14. The hook 14 is made of metal and has a circumferential surface configured entirely as a cam surface. More specifically, an upper jaw 14B and a lower jaw 14C are formed integrally with the peripheral part of the hook 14 and extend therefrom in a manner like claws. The hook 14 is rotatably mounted to a part close to a lower end of the base 11 via a connecting rod 30. A torsion spring 31 is wound around the connecting rod 30 and serves to bias the hook 14 in a counterclockwise direction (toward the lock lever 15 positioned on the front side) from a position where the hook 14 can hold the engaging pin 13 at the initial position shown in FIG. 10. A torsional stress is previously given to the torsion spring 31. The torsional spring 31 has one end hooked on a hooking jaw part 14E of the hook 14 and has the other end hooked on a hooking plate 32 that is fixedly mounted to the base 11. An engaging recess 14D is formed in the circumferential surface of the hook 14, so that an operation arm 15C of the lock lever 15 can engage the engaging recess 14D. Therefore, when no backside collision occurs, the hook 14 is prevented from pivoting in the counterclockwise direction against the biasing force of the torsion spring 31.

The lock lever 15 is also made of metal and can pivot relative to the base 11 about an axis of a fixing pin 9A. The fixing pin 9A is fitted into a front end of an operational rod 9 that can be rotated by an operational force applied from the second cable 50. The operational rod 9 has a cylindrical configuration and has an axial hole having a circular cross sectional configuration with its upper and lower end portions cut off (hereinafter called "deformed configuration"). As shown in FIG. 2, the operational rod 9 is inserted into a connecting hole 11E and an axial hole of a ring 11D so as to be rotatable relative thereto. The connecting hole 11E is formed in a lower end portion of one of the side plate portions 11S. A front end of the operational rod 9 extends toward the other of the side plate portions 11S through the ring 11D. The operational rod 9 has projections 9B formed thereon and serving to prevent the operational rod 9 from being removed. The fixing pin 9A has a cross section having the deformed configuration and is press-fitted into the axial hole of the operational rod 9 through the lock lever 15 and two restricting plates 17 that will be hereinafter described. More specifically, each of the lock lever 15 and the restricting plates 17 has an insertion hole having the deformed configuration. The fixing pin 9A is inserted into the insertion holes of the lock lever 15 and the restricting plates 17 before it is press-fitted into the axial hole of the operational rod 9. Therefore, the lock lever 15 and the restricting plates 17 are held between the operational rod 9 and the fixing pin 9A such that they can pivot about an axis of the fixing pin 9A. Because the operational rod 9, the lock lever 15, the restricting plates 17 and the fixing pin 9A are fitted with each other by using the deformed cross section, these parts can pivot in unison with each other.

A torsion spring 33 is wound around the operational rod 9 and is positioned between the ring 11D and the restricting plates 17. A torsional stress is previously given to the torsion spring 33. One end of the torsion spring 33 is hooked on a lower jaw 32E of a hooking plate 32. The other end of the torsion spring 33 is hooked on and extends through the restricting plates 17, hooked on the front edge of the operation arm 15C of the lock lever 15, and hooked on an upper jaw 32B of the hooking plate 32. With this arrangement, the restricting plates 17 are normally biased in a clockwise direction about the fixing pin 9A (or the operational rod 9) or a direction intersecting with the elongated slots 11H as viewed from a lateral side. At the same time, the lock lever 15 that can rotate together with the restricting plates 17 is biased in the same direction as the restricting plates 17 and toward the hook 14. The operational rod 9 is connected to the upper end of the second cable 50 (more specifically, the inner member 51), and therefore, the operational rod 9 can rotate about its axis as the inner member 51 of the cable 50 is pushed or pulled in the axial direction (vertical direction). The hooking plate 32 is configured not to interact with the elongated slots 11H, the connecting rod 30 and the operational rod 9.

The operation arm 15C of the lock lever 15 can be released from engagement with the hook 14 as the lock lever 15 pivots in the counterclockwise direction (i.e., a direction away from the hook 14) against the biasing force of the torsion spring 33. Therefore, the hook 14 can pivot in the counterclockwise direction (i.e. a direction toward the lock lever 15) together with the lock lever 15. The pivotal movement of the hook 14 is stopped when the hook 14 contacts with a base portion 15B of the lock lever 15. When in the lock condition where the pivotal movement of the hook 14 is prevented by the operation arm 15C of the lock lever 15, the upper jaw 14B is positioned to be opposed to the elongated slots 11H as viewed from the lateral side, and the hook 14 is held in position in a state where the upper jaw 14B and the lower jaw 14C are positioned on opposite sides of lower ends H0 of the elongated slots 11H. As the hook 14 pivots in the counterclockwise direction by the biasing force of the torsion spring 31 after disengagement from the operation arm 15C, the upper jaw 14B moves away from the elongated slots 11H, while the lower jaw 14C moves upward to be opposed to the elongated slots 11H as viewed from the lateral side.

The hook 14 constructed as described above can engage the lock lever 15 to hold the lock lever 15 at the initial position by moving the engaging pin 13 downward until the engaging pin 13 reaches the lower ends H0 of the elongated slots 11H. More specifically, when the engaging pin 13 is not positioned within the lower ends H0 of the elongated slots 11H, the lower jaw 14C is positioned to be opposed to the elongated slots 11H. Therefore, as the engaging pin 13 moves downward from this position toward the lower ends H0 of the elongated slots 11H, the lower jaw 14C of the hook 14 is pushed by the engaging pin 13 to move away from the elongated slots 11H. As the lower jaw 14C is pushed by the engaging pin 13 in this way, the hook 14 pivots in the clockwise direction, so that the upper jaw 14B moves to be opposed to the elongated slots 11H from the upper side of the engaging pin 13. As the hook 14 pivots in the clockwise direction, the operation arm 15 of the lock lever 15 engages the engaging recess 14D of the hook 14, so that the hook 14 is locked in this position. Hence, the engaging pin 13 is brought into the state where the engaging pin 13 is positioned between the upper jaw 14B and the lower jaw 14C and is held to be positioned at the lower ends H0 of the elongated slots 11H (initial position). Because the engaging pin 13 is held at the lower ends H0 of the elongated slots 11H, the support 4A can be held at the initial position.

Returning to FIGS. 2 and 10, the restricting plates 17 are formed of metal plates and have configurations elongated to extend from the fixed pin 9A (or the operational rod 9) to a position proximal to upper ends H3 of the elongated slots 11H as viewed from the lateral side. The restricting plates 17 are positioned on opposite sides (right and left sides) of the lock lever 15 and are normally held at a position to intersect with a path of the sliding movement of the engaging pin 13 along the elongated slots 11H. When the engaging pin 13 is positioned on the lower side (the side of the initial position) of the restricting plates 17, the engaging pin 13 can move to the collision accommodating position against the biasing force applied from the restricting plates 17. Thus, the restricting plates 17 permit the engaging pin 13 to slidably move from the initial position to the collision accommodating position when the backside collision occurs. However, the restriction plates 17 prevent the engaging pin 13 from moving from the collision accommodating position to the initial position as will be explained later. A stepped portion 17B is formed on a rear edge (an edge opposing to the elongated slots 11H) of each of the restricting plates 17 at a midpoint along the longitudinal direction of the rear edge. A top surface 17A and the stepped portion 17B of each of the restricting plates 17 are configured to be able to intersect with the sliding path of the engaging pin 13 in a stepwise manner.

Referring to FIG. 2, the support 4A is made of synthetic resin and is molded into one piece to have a plate-like configuration curved along its entire length and to have a size sufficient for covering the front side of the headrest moving mechanism 10. A rear cover 4R covers the back side the headrest moving mechanism 10. The rear cover 4R has engaging projections 4T extending outwardly from the left and right side portions and the upper side portion of the rear cover 4R. The engaging projections 4T are engaged with corresponding engaging tabs 4S formed on the left and right side edges and the upper edge of the support 4A (four engaging projections 4T and four engaging tabs 4S are shown in FIG. 2). When the headrest moving mechanism 10 is covered by the support 4A and the rear cover 4R, the left and right stays 4B extend through elongated holes 4L formed in the lower side portion of the rear cover 4R. The number and the configurations of the engaging tabs 4S and the engaging projections 4T may not be limited to those shown in FIG. 2 but may be suitably determined as long as the support 4A and the rear cover 4R can be reliably attached to each other.

Figure 3:
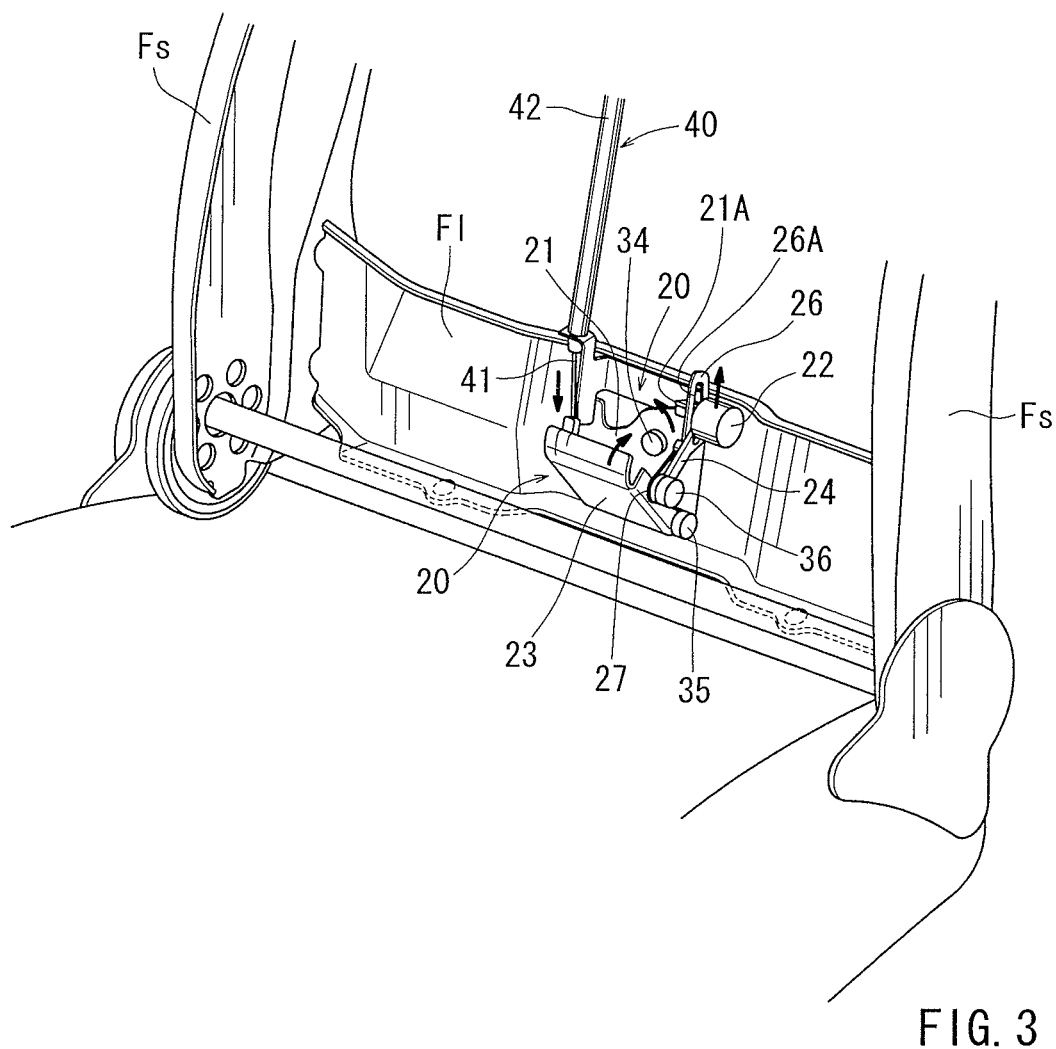
FIG. 3 is a perspective view of a detecting device of the vehicle seat.

Next, the detection device 20 will be described. When the backside collision occurs, the detection device 20 detects the rearward leaning load applied from the passenger as a mechanical operation amount and pulls the first cable 40. As shown in FIGS. 1 and 3, within the seatback 2, a lower frame F1 extends between left and right side frames Fs of the back frame 2F. The lower frame F1 extends at a level for opposing to the rear side of a lumber of the seated passenger. The detecting device 20 is mounted to the central portion with respect to the left and right directions of the front portion of the lower frame F1. The detection device 20 includes a releasing plate 21, an operation pin 22, a load receiving plate 23 and a link member 24. The releasing plate 21 is operated for pulling the first cable 40. The operation pin 21 serves to pivotally move the releasing plate 21. The load receiving plate 23 can receive the rearward leaning load applied from the passenger. The link member 24 is connected between the load receiving plate 23 and the operation pin 21.

The releasing plate 21 is pivotally supported by a support pin 34, so that the left and right side portions of the releasing plate 21 can move up and down about the support pin 34. The first cable 40 (more specifically, the inner member 41) is connected to the left side portion (as viewed in FIGS. 1 and 3) of the releasing plate 21. The operation pin 22 is vertically slidably inserted into a vertically elongated slot 26A formed in the upper portion of a support plate 26 that is fixedly mounted to the front surface of the lower frame F1. A support pin 35 is fixedly inserted into the lower portion of the support plate 26 and pivotally supports the load receiving plate 23, so that the load receiving plate 23 can pivot in forward and rearward directions about the support pin 35. The link member 24 is pivotally connected to both of a support pin 36 and the operation pin 22 and extends therebetween. The support pin 36 is fixedly inserted into the upper portion of a side surface of the load receiving plate 23. A tension spring (not shown) is hooked on the right side portion (as viewed in FIGS. 1 and 3) of the releasing plate 21 and the support pin 35 and extends therebetween. Therefore, the releasing plate 21 is biased in such a direction that the right side portion of the releasing plate 21 moves downward and that the left side portion of the releasing plate 21 moves upward. A torsion spring 27 is wound around the support pin 36 and has one end hooked on the support pin 35 positioned on the lower side and has the other end hooked on the link member 24. Therefore, the load receiving plate 23 is normally biased forwardly and is held to be inclined forwardly relative to the lower frame F1 when no backside collision occurs. In addition, the operation pin 22 in engagement with the link member 24 is normally positioned at the lower end of the elongated slot 26A. In this state, the front end of the operation pin 22 is in contact with a projecting tab 21A that is formed integrally with the releasing plate 21 and extends forwardly from the upper edge of the right side portion of the releasing plate 21.

Figure 4:
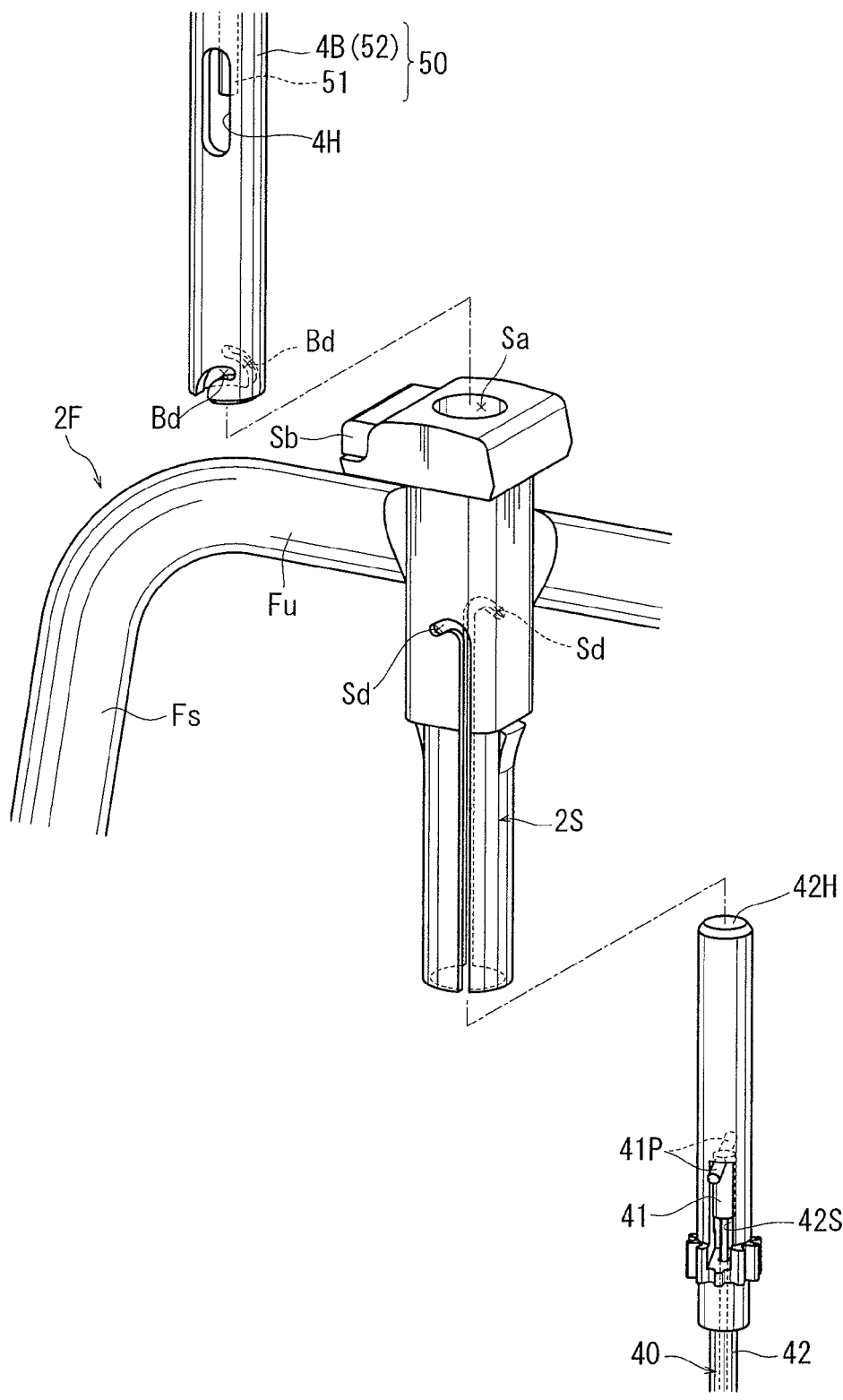
FIG. 4 is an exploded perspective view of the cable connecting device for connecting between a first cable and a second cable.

As shown in FIG. 4, the connecting ends of the first cable 40 and the second cable 50 can be connected to each other at a region where the left side stay 4B of the headrest 4 is inserted into the corresponding support 2S. According to a cable connecting device of this embodiment, the first cable 40 and the second cable 50 can be connected to and removed from each other based on the operation of inserting the left side stay 4B into the support 2S and the operation of removing the left side stay 4B from the support 2S, respectively. Therefore, the operations for mounting the headrest 4 to the seatback 2 and for removing the headrest 4 from the seatback 2 can be smoothly performed.

More specifically, the first cable 40 has the inner member 41 and an outer member 42. The inner member 41 has a linear shape and is flexibly deformable. The outer member 42 has a tubular configuration and the inner member 41 is inserted into the outer member 42. Therefore, the first cable 40 has a double structure. An engaging projection 41P is formed on the upper end of the inner member 41 and extends radially outward in a manner like a T-shape. A pair of elongated slots 42S are formed in the circumferential wall on the side of the upper end of the outer member 42 in order to enable the radially opposite ends of the engaging projection 41P to extend radially outward through the elongated slots 42S. The elongated slots 42S are elongated in the axial direction of the outer member 42, so that the inner member 41 is permitted to move relative to the outer member 42 in the axial direction within a range corresponding to the length of the elongated slots 42S. A head 42H is formed on the upper end of the outer member 42 to close the upper opening of the outer member 42.

The first cable 40 constructed as described above can be supported in a suspended manner by one of the supports 2S (left side support 2S in this embodiment) by inserting the upper connecting end of the first cable 40 into the insertion hole Sa of the one of the supports 2S from the lower side.

More specifically, a pair of insertion slots Sd are formed in the circumferential wall of the left side support 2S at two positions so as to be symmetrical with respect to the axis of the left side support 2S. The insertion slots Sd extend upwardly from the lower end of the left side support 2S. In FIG. 4, the insertion slots Sd are indicated by solid lines and dashed lines on the left front side and the right back side of the left side support 2S, respectively. The insertion slots Sd are configured to be able to receive in the axial direction the radially opposite ends of the T-shaped engaging projection 41P formed on the upper end of the inner member 41. Each of the upper ends of the insertion slots Sd extends to a position proximal to the lower surface of the upper frame Fu of the back frame 2F, to which the supports 2S are fixedly attached. As the connecting end of the first cable 40 is inserted into the insertion hole Sa of the left side support 2S from the lower side, the engaging projections 41P can engage the insertion slots Sd and can move in the axial direction along the insertion slots Sd.

Figure 5:
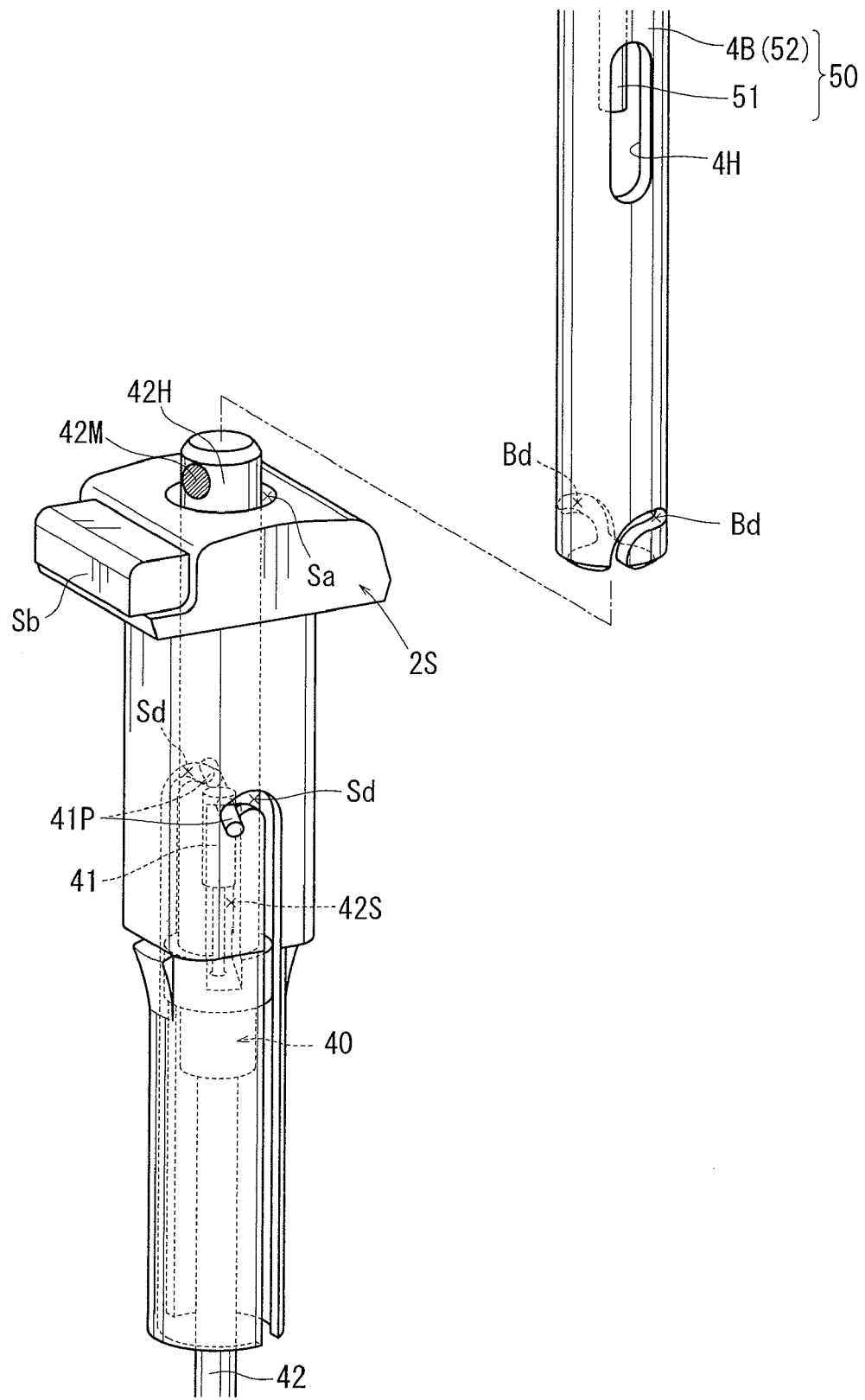
FIG. 5 is a perspective view showing the state where the first cable is suspended within a support before a stay of a headrest is inserted into the support.

An upper end portion of the insertion slot Sd shown on the left front side in FIG. 4 is formed to have a configuration curved leftward in the circumferential direction. On the other hand, an upper end portion of the insertion slot Sd shown on the right back side in FIG. 4 is formed to have a configuration curved rightward in the circumferential direction so as to be symmetrical with the upper end portion of the insertion slot Sd shown on the left front side. Therefore, the upper end portions of the insertion slots Sd are curved in the same circumferential direction and are oriented axially downward. Therefore, the first cable 40 can be inserted into the support 2S such that the radially outer ends of the engaging projection 41P are axially inserted into the insertion slots Sd along their configurations. Then, the radially outer ends of the engaging projection 41P can be moved to reach the terminal ends of the upper end portions of the insertion slots Sd by rotating the first cable 40 in the circumferential direction along the curved configurations of the upper end portions of the insertion slots Sd (see FIG. 5). Hence, the movement of the engaging projection 41P in the axial direction (both the direction of gravitational force and the direction opposite thereto) relative to the support 2S can be restricted, and the first cable 40 can be held in a suspended manner on the condition that the connecting end of the cable 40 is inserted into the insertion hole Sa of the support 2S. Here, the head 42H of the outer member 42 is configured to have such a length that the head 42H extends upward beyond the upper ends of the elongated slots 42S by a predetermine distance. Therefore, as best shown in FIG. 5, the head 42H extends upward from the support 2S in the state where the engaging projection 41P is in engagement with the terminal ends of the insertion slots Sd and the first cable 40 is suspended within the support 2S.

The circumferential wall on the side of the upper end of the outer member 42 is made of synthetic resin and a part along an axial direction of the circumferential wall is formed to have a shape expanded radially outward to conform to the configuration of the inner surface of the insertion hole Sa. On the outer surface of the radially expanded part and along its entire circumferential length, a plurality of concave and convex portions are formed in a serrated manner and extend in the axial direction. Therefore, the outer member 42 can be fitted into the insertion hole Sa without causing substantial movement or without rattling. In addition, the outer member 42 can smoothly move into the insertion hole Sa in the axial direction.

When the lower end of the inner member 41 of the first cable 40 is pulled downward by the releasing plate 21, the lower end of the inner member 41 is drawn out of the lower end of the outer member 42. As may be seen from FIG. 1, both of the inner member 41 and the outer member 42 of the first cable 40 have the flexibility and the first cable 40 is routed within the seatback 2 such that the first cable 40 is curved to avoid interference with other devices, such as devices necessary for air conditioning (not shown), disposed within the seatback 2.

The second cable 50 is routed within the headrest 4 and has the inner member 51 and an outer member 52 that is constituted by one of the stays 4B (the stay 4B positioned on the left side as viewed in FIG. 1 according to this embodiment). The inner member 51 has a rod-like shape and has a relatively large rigidity. The inner member 51 is inserted into the outer member 52, so that the second cable 50 also has a double structure. Because the left side stay 4B serves as the outer member 52, the construction of the outer member 52 will be described for the construction of the left side stay 4B. The lower end of the second cable 50 is configured as the connecting end for connecting with the upper end of the first cable 40. More specifically, as shown in FIGS. 4 and 5, the inner member 51 is held within the left side stay 4B in a suspended manner. In this suspended state, the lower end of the inner member 51 is positioned above the lower end of the left side stay 4B by a predetermined distance. A pair of receiving slots Bd are formed in the circumferential wall of the left side stay 4B to be symmetrical with respect to the axis of the stay 4B and extend upwardly from the lower end of the stay 4B in the axial direction. In FIGS. 4 and 5, the receiving slots Bd positioned on the left front side and the right back side are indicated by solid lines and dashed lines, respectively. A vertically elongated view window 4H is formed in the circumferential wall of the stay 4B throughout its thickness at a position proximal to or opposed to the lower end of the inner member 51, so that the inside of the stay 4B can be viewed through the view window 4H from the outer side. As the stay 4B is inserted into the insertion hole Sa, the receiving slots Bd can receive the radially outer ends of the T-shaped engaging projection 41P formed on the upper end of the inner member 41 of the first cable 40 that is held within the insertion hole Sa of the support 2S (left side support 2S). More specifically, the stay 4B receives the head 42H of the outer member 42 of the first cable 40 while the receiving slots Bd receive the radially outer ends of the engaging projection 41P. In addition, as the stay 4B is inserted into the insertion hole Sa of the support 2S, the engaging projection 41 can move in the axial direction in the state of engagement with the receiving slots Bd.

Figure 6:
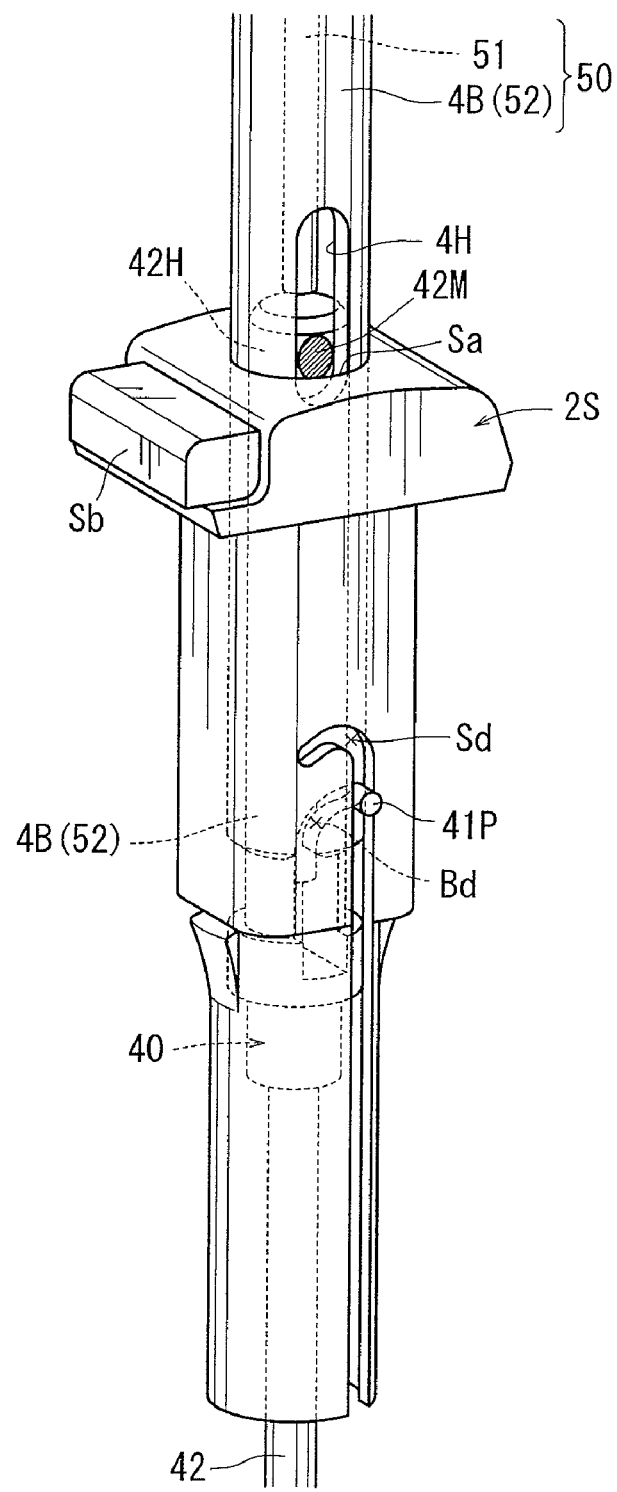
FIG. 6 is a perspective view showing the state where the stay of the headrest has been inserted into the support and the first cable and the second cable have been connected to each other.

Returning to FIGS. 4 and 5, an upper end portion of the receiving slot Bd shown on the left front side is formed to have a configuration curved rightward in the circumferential direction. An upper end portion of the receiving slot Bd shown on the right back side is formed to have a configuration curved leftward in the circumferential direction so as to be symmetrical with the upper end portion of the insertion slot Bd shown on the left front side. Therefore, the upper end portions of the receiving slots Bd are curved in directions opposite to the upper end portions of the insertion slots Sd. Hence, as the stay 4B is inserted into the insertion holes Sa of the support 2S as shown in FIG. 6, the radially outer ends of the engaging projection 41P are forced to return from the terminal ends of the upper end portions of the insertion slots Sd. For example, one of the radially outer ends of the engaging projection 41P positioned on the right front side is forced to return from the terminal end of the corresponding insertion slot Sd under the guide of the rightwardly curved upper end portion of the light front side receiving slot Bd. The other of the radially outer ends of the engaging projection 41P positioned on the left back side (not shown in FIG. 6) is forced to return from the terminal end of the corresponding insertion slot Sd while it moves along a path that is symmetrical with the path of movement of the one of the radially outer ends. As the engaging projection 41P moves to reach the terminal ends of the receiving slots Bd, the engaging projection 41P causes the outer member 42 of the first cable 40 to rotate by an angle of about 45°, and the engaging projection 41P moves away from the terminal ends of the insertion slots Sd to their linearly axially extending portions. Therefore, the engaging projection 41P is brought to the state where the engaging projection 41P can move in the axial direction of the support 2S (the direction of the gravitational force and the opposite direction) while being prevented from moving in the axial direction relative to the stay 4B. Thus, in this state, the engaging projection 41P cannot move relative to the stay 4B in the axial direction due to the intersecting relationship between the receiving slots Bd and the insertion slots Sd. On the other hand, the engaging projection 41P can move only in the axial direction relative to the support 2S. In other words, the engaging projection 41P engages the stay 4B such that the upper end of the inner member 41 of the first cable 40 and the lower end of the outer member (stay 4B) of the second cable 50 are connected to each other with respect to the axial direction.

Here, as shown in FIG. 6, when the stay 4B has been inserted into the insertion hole Sa of the support 2S and the engaging projection 41P has moved from the insertion slots Sd to a position where the engaging projection 41P is engaged with the receiving slots Bd of the stay 4B, the head 42H of the outer member 42 of the first cable 40 extending upward from the support 2S can be viewed through the view window 4H formed in the stay 4B. Thus, the distance between the view window 4H and the lower end of the stay 4B is set to be substantially equal to the distance between the upper end of the insertion slot Sd and the upper ed surface of the support 2S and also substantially equal to the distance between the engaging projection 41P and the head 42H of the outer member 42. In addition, the distance between the lower end of the inner member 51 of the second cable 50 and the lower end of the stay 4B is set to be slightly longer than the axial length of the head 42H. In other words, the lower end of the inner member 51 is positioned at a level slightly higher than the head 42H. With these arrangements, the connecting end of the first cable 40 and the connecting end of the second cable 50 can be viewed simultaneously through the view window 4H, and therefore, an operator can visually confirm that the first cable 40 is not removed from the support 2S during the connecting operation.

A mark 42M is printed on a predetermined region of the outer surface of the head 42H of the outer member 42 for providing visual recognition of the connecting condition. As the stay 4B is inserted into the insertion hole 2S on the condition that the first cable 40 is suspended within the support 2S, the engaging projection 41P moves from the insertion slots Sd to the receiving slots Bd while it causes the rotation of the outer member 42 of the first cable 40 in the circumferential direction. Because of this rotation of the outer member 42, the mark 42M printed on the head 42H moves to a position opposed to the view window 4H. In other words, if the head 42H does not rotate due to some trouble, the mark 43M cannot be viewed through the view window 4H. The region of the outer surface of the head 42H on which the mark 42M is printed may be any region as long as (a) the mark 42M cannot be viewed through the view window 4H unless the head 42H rotates in the circumferential direction and (b) the mark 42M can be viewed through the view window 4H when the head 42H has rotated in the circumferential direction. Thus, because the rotation of the outer member 42 of the first cable 40 can be viewed through the view window 4H, it is possible to confirm that the first cable 40 and the second cable 50 have been reliably connected to each other.

Figure 7:
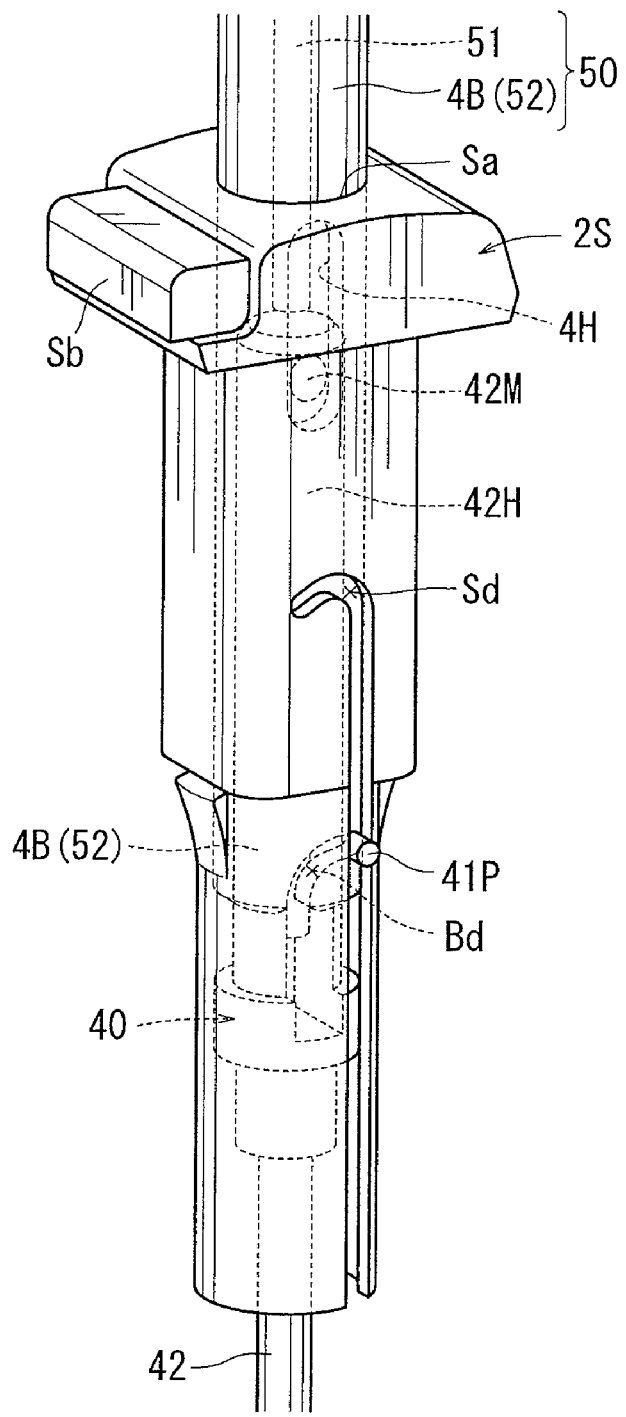
FIG. 7 is a perspective view showing the state where the stay has been inserted further into the support after connection between the first and second cables.

After the first cable 40 and the second cable 50 have been connected to each other with respect to the axial direction, the stay 4B can be inserted further into the support 2S. Thus, in the connected state between the first cable 40 and the second cable 50, it is possible to insert the stay 4B further into the support 2S until it reaches a usable position where the stay 4B is locked against the support 2S as shown in FIG. 7. When the stay 4B reaches the usable position, the view window 4H opposed to the head 42H of the outer member 42 of the first cable 40 and the lower end of the inner member 51 of the second cable 50 is positioned completely within the support 2S. Therefore, the view window 4H cannot be viewed from the outer side, so that it is possible to avoid degradation in the design of the vehicle seat 1.

Figure 8:
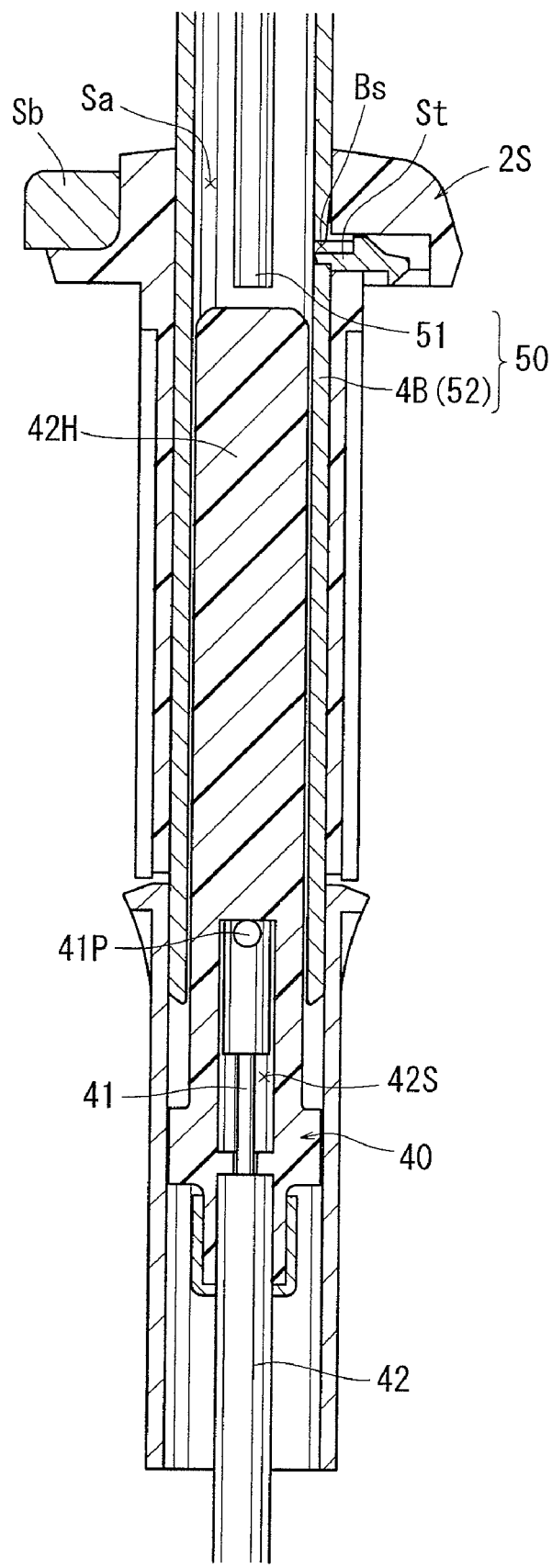
FIG. 8 is a vertical sectional view as viewed from a front side and showing the cable connecting device.
Figure 9:
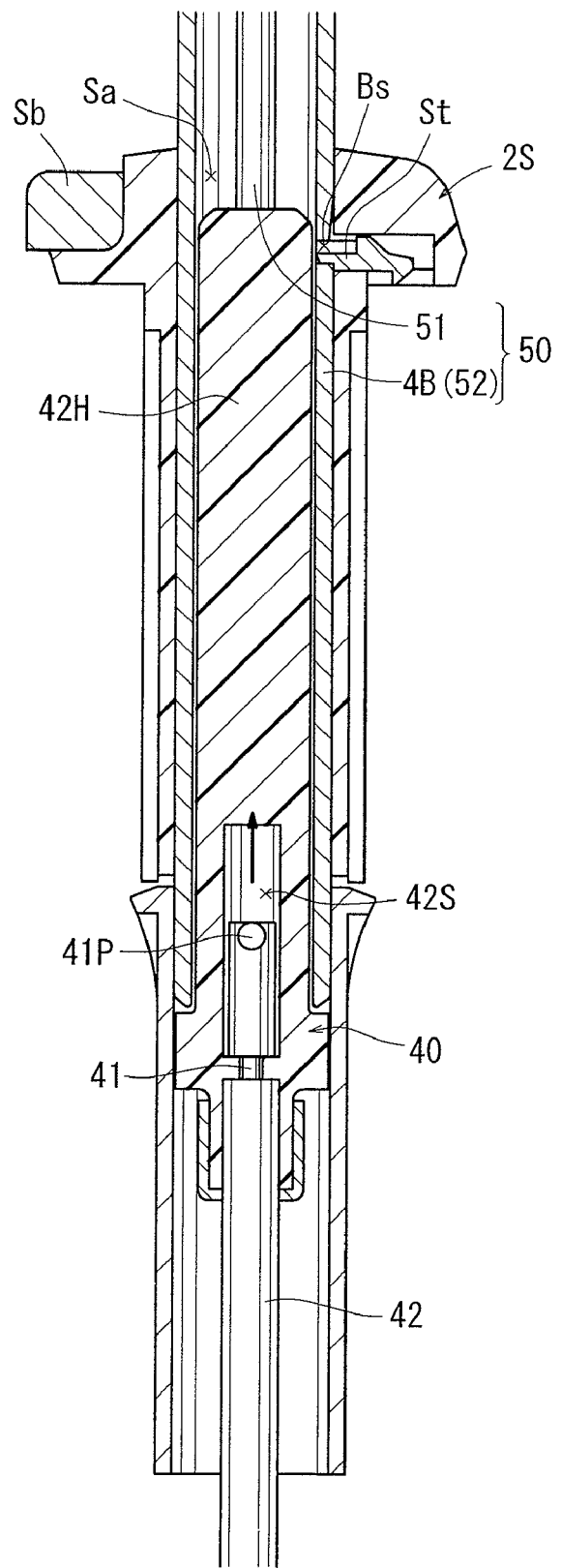
FIG. 9 is a vertical sectional view showing the state where the first cable has been pulled from the position shown in FIG. 7.

AS show in FIGS. 8 and 9, an engaging recess Bs having a concave shape is formed in the circumferential wall of the left side stay 4B by cutting a part of the circumferential wall. In addition, an engaging claw St is provided within the left side support 2S and is biased toward the insertion hole Sa. The engaging claw St is normally held to extend into the insertion hole Sa and can be moved out of the insertion hole Sa by the operation of pressing a knob Sb from a lateral side. Therefore, by inserting the stay 4B into the insertion hole Sa with the knob Sb pressed from the lateral side, releasing the knob Sb and inserting the stay 4B further into the insertion hole Sa, the engaging claw St can automatically engage the engaging recess Bs when the engaging claw St has moved to a position opposed to the engaging recess Bs. Therefore, the stay 4B can be locked against the movement in the inserting direction. A plurality of the engaging recesses Bs may be formed in the circumferential wall and spaced from each other in the axial direction. With this arrangement, it is possible to selectively change the height of installation of the headrest 4 by pressing the knob Sb and changing the amount of insertion of the stay 4B into the support 2S.

In addition, the headrest 4 can be removed from the seatback 2 by pressing the knob Sb and removing the stays 4B from the corresponding supports 2S. As the stays 4B are removed, the connecting condition between the upper end of the inner member 41 of the first cable 40 and the lower end of the stay 4B can be released. Thus, as the left side stay 4D is moved in a removing direction from the insertion hole Sa of the corresponding support 2S, the radially outer end of the engaging projection 41P positioned on the right front side is forced to return away from the terminal end of the corresponding receiving slot Bd under the guide of the corresponding insertion slot Sd that is positioned on the right front side of the support 2S and curved leftward. Similarly, the radially outer end of the engaging projection 41P positioned on the left back side is forced to return away from the terminal end of the corresponding receiving slot Bd along a path symmetrical with the path of the movement of the radially outer end of the engaging projection 41P positioned on the right front side. In this way, the engaging projection 41P moves away from the terminal ends of the receiving slots Bd to a position where the receiving slots Bd extend substantially axially linearly as the engaging projection 41P moves toward the terminal ends of the inserting slots Sd. Therefore, the engaging projection 41P is brought to a state where the engaging projection 41P can move in the axial direction relative to the stay 4B but is prevented from moving in the axial direction relative to the support 2S. Hence, the connecting condition between the stay 4B and the first cable 40 is released and the stay 4B can be removed from the support 2S.

As shown in FIG. 8, in the state where the first cable 40 and the second cable 50 are connected to each other, the lower end of the inner member 51 of the second cable 50 is positioned upwardly away from the head 42H of the outer member 42 of the first cable 40 by a small distance. Therefore, the inner member 51 of the second cable 50 is not pushed upward by the head 42H when the stay 4B is inserted into the support 2S. As shown in FIG. 9, the inner member 51 can be pushed upward by the head 42H when the inner member 41 of the first cable 40 is pulled downward. Thus, the stay 4B serving as the outer member 52 of the second cable 50 is connected to the inner member 41 of the first cable 40 so as to be integrated therewith with respect to the axial direction. Therefore, if the inner member 41 of the first cable 40 is pulled downward, the outer member 42 moves upward relative to the inner member 41, so that the head 42H of the outer member 42 can push the inner member 51 of the second cable 50 upward.

As the inner member 51 of the second cable 50 is pushed upward, the operational rod 9 is rotated about its axis, so that the support 4A is released from the holding state at the initial position. In this way, the first cable 40 is constructed as a pull-type cable, in which the inner member 41 can be pulled downward. On the other hand, the second cable 50 is constructed as a push-type cable in which the inner member 51 can be pushed upward. The structure for axially connecting between the first cable 40 and the second cable 50 is configured as a reverse-type connecting structure. Thus, when the stay 4B is inserted, the first cable 40 and the second cable 50 are brought to the connected state where the inner member 41 and the outer member 52 (stay 4B) are connected to each other with respect to the axial direction and the outer member 42 and the inner member 51 are connected to each other with respect to the axial direction (enabling the cable operation by the pushing operation).

The operation of the above embodiment will now be described. Referring to FIG. 1, the headrest 4 can be removably mounted to the seatback 2. Thus, the headrest 4 can be mounted to the upper portion of the seatback 2 by inserting the stays 4B extending downwardly from the headrest 4 into the insertion holes Sa of the supports 2S. By inserting the left side stay 4B into the corresponding hole Sa, the first cable 40 and the second cable 50 can be connected to each other with respect to the axial direction. According to the vehicle seat 1 assembled in this way, the support 4A of the headrest 4 can be normally held at the initial position when no backside collision occurs.

If the backside collision occurs, the receiving plate 23 of the detection device 20 is forced to move rearward as shown in FIG. 3 by the rearwardly leaning load that may be applied to the seatback 2 by the passenger. Then, the operation pin 22 is pushed to move upwardly along the elongated slot 26A via the link member 24 connected to the receiving plate 23. Therefore, the operation pin 22 pushes the projection tab 21A upward, so that the left side portion of the releasing plate 21 pivots downwardly to pull the inner member 41 of the first cable 40. Here, when the operation pin 22 moves to the upper end of the elongated slot 26A, the operation pin 22 is released from contacting with the projection tab 21A, so that the releasing plate 21 moves to the initial position by the biasing force of the tension spring. Therefore, the inner member 41 of the first cable 40 may be pulled during a short period of time. After reaching to a position on the upper side of the projection tab 21A of the releasing plate 21, the operation pin 22 moves to the front side of the projection tab 21A and then to a position for again contacting with the lower surface of the projection tab 21A by the biasing force of the torsion spring 27. At the same time, the receiving plate 23 returns to the initial position.

As the inner member 41 of the first cable 40 is pulled downward, the outer member 42 moves upward relative to the inner member 41 as shown in FIG. 9. Therefore, the inner member 51 of the second cable 50 is pushed upward by the head 42H of the outer member 42. As the inner member 51 is pushed upward, the operational rod 9 rotates for releasing the state of holding the initial position of the support 4A. More specifically, as the inner member 51 is pushed upward, the operational rod 9 rotates in a counterclockwise direction from the initial position shown in FIG. 10. Then, the lock lever 15 rotates together with the operational rod 9 in the counterclockwise direction (i.e., the direction away from the hook 14), and the restricting plates 17 pivot together with the lock lever 15 in the counterclockwise direction to move away from the sliding path of the engaging pin 13. In this embodiment, the lock lever 15 and the restricting plates 17 rotate or pivot by a maximum angle of about 20° from their initial positions. As the lock lever 15 pivots away from the hook 14, the engagement between the operation arm 15C and the engaging recess 14D is released, so that the state of preventing pivotal movement or the lock condition of the hook 14 is released. Then, the hook 14 also pivots in the counterclockwise direction to release the holding state of the engaging pin 13. The pivotal movement of the hook 14 is limited by the contact with the base 15B of the lock lever 15.

Figure 12:
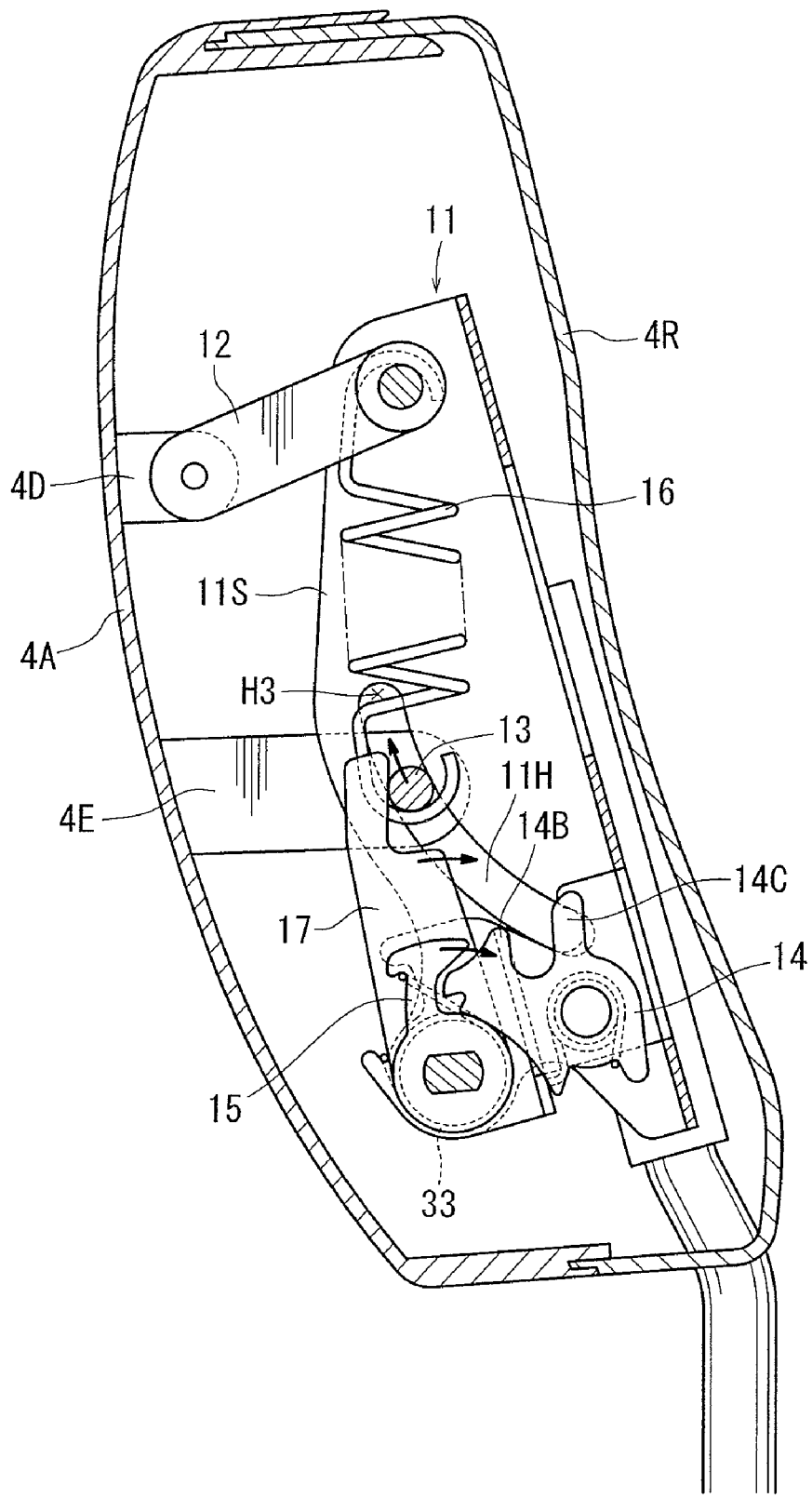
FIG. 12 is a view similar to FIG. 10 but showing the state where the engaging pin is positioned at a midpoint during an upward sliding movement along an elongated slots.

After the holding state of the engaging pin 13 by the hook 14 has been released, the upper jaw 14B of the hook 14 pivots in a direction away from the elongated slots 11H as viewed from the lateral side while the lower jaw 14C moves from the lower side of the engaging pin 13 to a position opposed to or intersect with the elongated slots 11H (as viewed from the lateral side) for pushing the engaging pin 13. In addition, by the biasing force of the tension spring 16, the engaging pin 13 movies to slide along the elongated slots 11H toward their upper ends H3 as shown in FIG. 12. Then, the support 4A moves forwardly and upwardly from the initial position shown in FIG. 10 to the collision accommodating position toward the head of the passenger followed by the pivotal movement of the link member 12 and the movement of the connection arm 4E. Here, the inner member 51 of the second cable 50 is pushed upward during a short period of time. Therefore, during the period of the movement of the engaging pin 13 upward along the elongated slots 11H after being released from the holding condition, the restricting plates 17 pivot in a direction for again intersecting with the sliding path of the engaging pin 13 by the biasing force of the torsion spring 33. In addition, the lock lever 15 moves in a direction for contacting with the hook 14 simultaneously with the movement of the restricting plates 17. During this operation, even in the case that the restricting plates 17 return to the initial position before the engaging pin 13 reaches the upper ends H3 of the elongated slots 11H, the engaging pin 13 still can slide upward by pushing the restricting plates 17 away from the moving path of the engaging pin 13 against the biasing force of the torsion spring 33.

Figure 13:
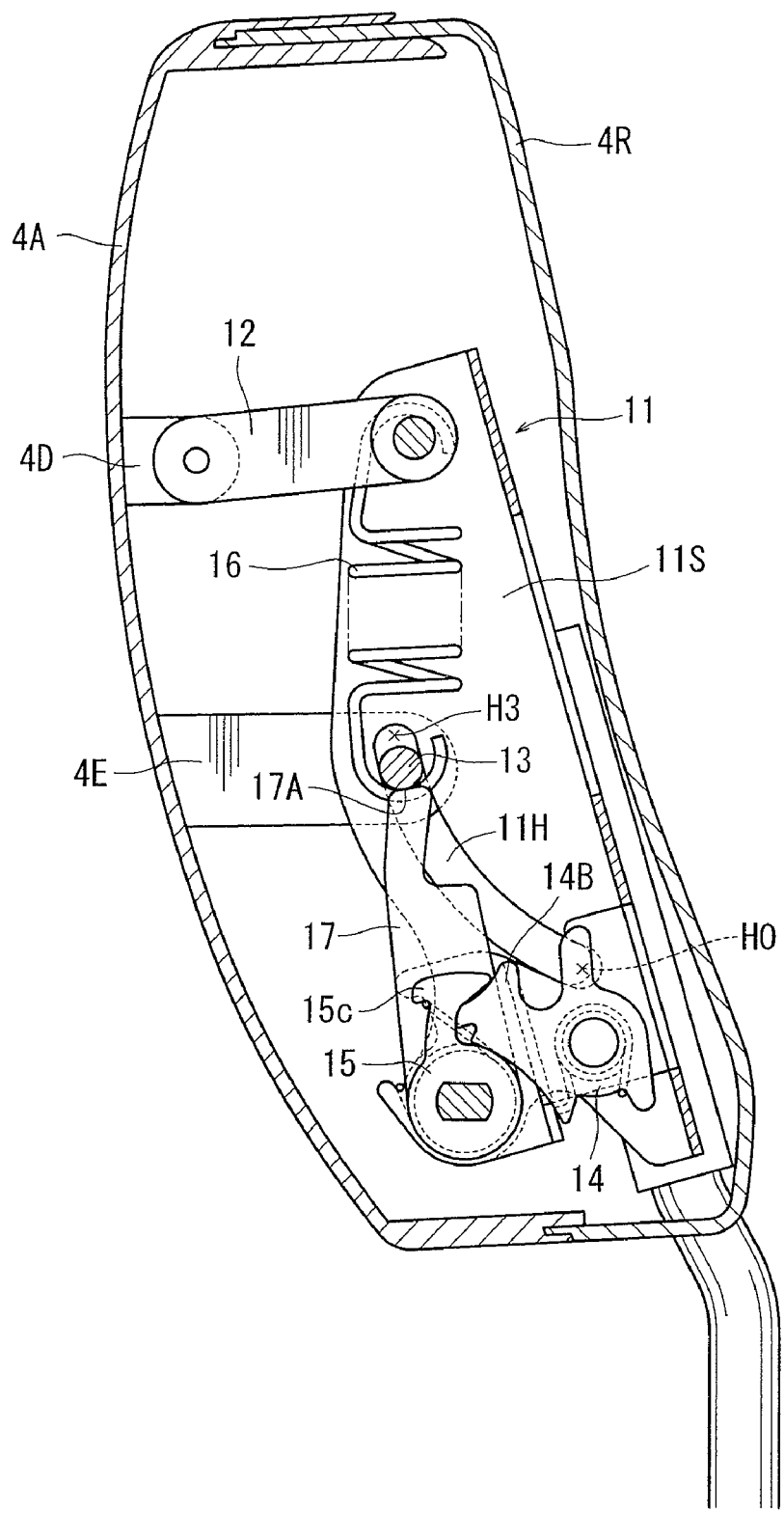
FIG. 13 is a view similar to FIG. 10 but showing the state where the headrest is positioned at a collision accommodating position.

When the engaging pin 13 reaches the upper ends H3 of the elongated slots 11H as shown in FIG. 13, the restricting plates 17 intersect the elongated slots 11H as viewed from the lateral side. In other words, the restricting plates 17 interrupt the sliding path of the engaging pin 13. Therefore, the engaging pin 13 positioned at the upper ends H3 of the elongated slots 11H can be prevented from returning to the initial position at the lower ends H0 of the elongated slots 11H due to contact with upper surfaces 17A of the restricting plates 17. In this state, although a downward and rearward pressing force may be applied to the restricting plates 17 by the engaging pin 13, the restricting plates 17 may not move rearward (clockwise direction) because the operation arm 15C of the lock lever 15 contacts the upper surface of the upper jaw 14B of the hook 14. Therefore, even in the case that the head of the passenger is forced toward the headrest 4 due to the backside collision, the support 4A can be reliably held at the collision accommodating position.

Figure 14:
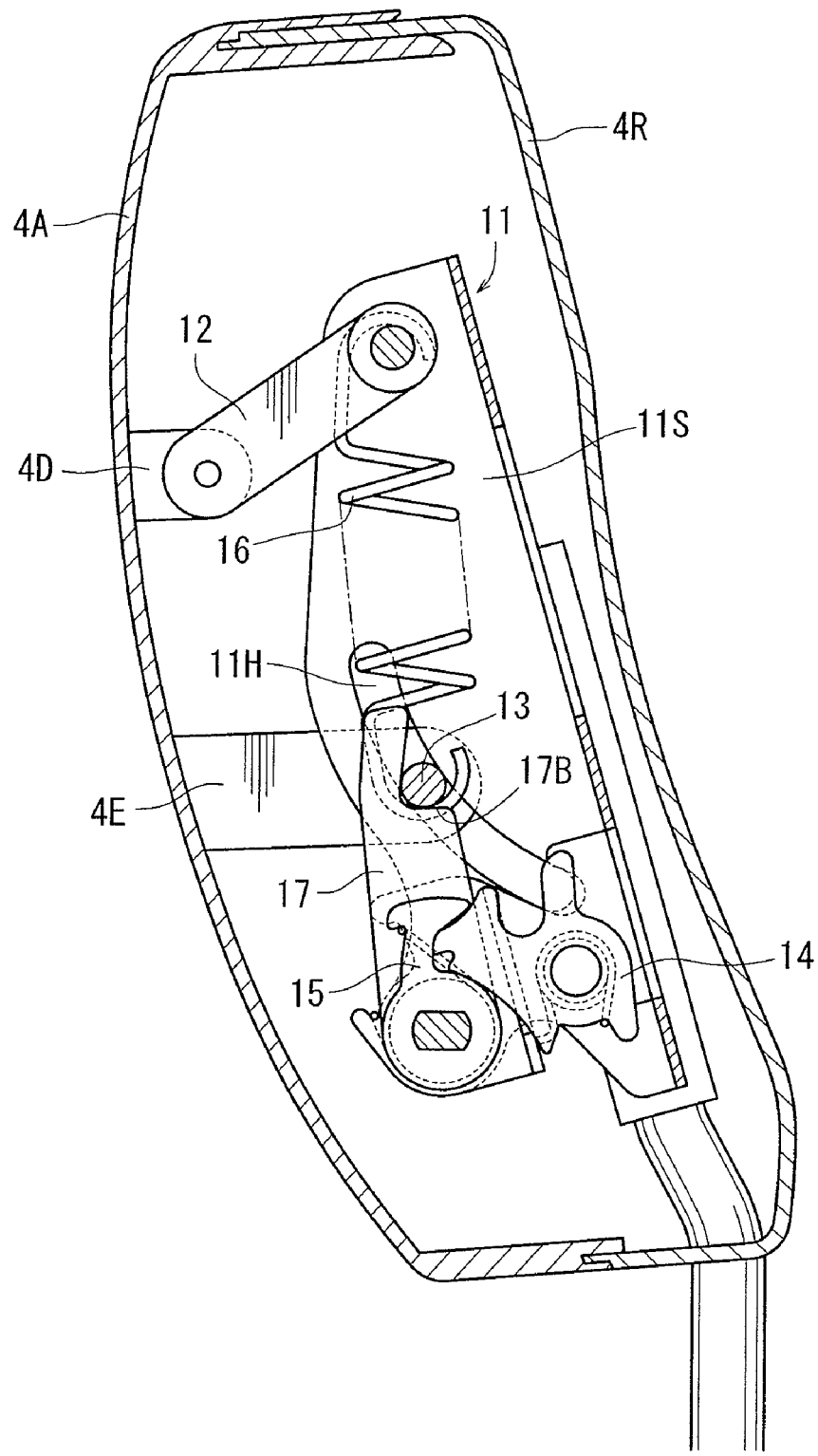
FIG. 14 is a view similar to FIG. 10 but showing the state where the headrest is held at a midpoint during the movement toward the collision accommodating position.

When the backside collision occurs, it may be possible that the head of the passenger contacts the support 4A during the forward and upward movement of the support 4A from the initial position or before the support 4A reaches the collision accommodating position shown in FIG. 12. However, in this case, the engaging pin 13 can be received by the stepped portions 17B formed at the middle positions in the lengthwise direction of the restricting plates 17 as shown in FIG. 14. Therefore, it is possible to prevent the engaging pin 13 from returning to the initial position along the elongated slots 11H. Hence, it is possible to prevent the support 4A from returning rearward even in the case that the support 4A is positioned at a midpoint before reaching the collision accommodating position. As a result, the head of the passenger can be received by the support 4A that is held at a fixed position.

Although in the above embodiment, only one view window 4H is provided at one position of the circumferential wall of the stay 4B, a plurality of view windows 4H may be provided at plural positions at the same level. For example, two to four view windows 4H may be provided. Increase in the number of the view windows 4H is advantageous because it enables to view the inside from different directions. Increase in the number of the view windows 4H may not cause degradation in the design because the view windows 4H are eventually hidden within the support 2S.

Further, although the mark 42M is printed on the outer member 42 of the first cable 40 at a region that can oppose to the view window 4H as the outer member 42 rotates in the circumferential direction, it is possible to print the mark 42M on the outer member 42 at a region that does not oppose to the view window 4H as the outer member 42 rotates in the circumferential direction. Thus, the mark 42M may be viewed if the head 42H does not rotate in the circumferential direction, while the mark 42M may not be viewed if the head 42H rotates in the circumferential direction. Also with this arrangement, it is possible to visually recognize the condition of the head 42H and eventually the condition of the first cable 40. In brief, it is only required that the design or appearance of the head 43H viewable through the view window 4H is changed as the head 42H rotates.

Furthermore, the mark 42M may not be limited to a printed two-dimensional pattern for enabling recognition of change of the viewable pattern but may be a three-dimensional pattern, such as a concave or convex pattern, for enabling recognition of change of the viewable shape.

According to the cable connecting device of the above embodiment, the first cable 40 and the second cable 50 are coupled to the headrest moving mechanism 10 disposed within seatback 2 and the headrest moving mechanism 10 disposed within the headrest 4, respectively. However, the first and second cables 40 and 50 may be coupled to any other mechanisms of the vehicle seat as long as it is necessary to be interlocked with each other.

What is claimed is:

1. A cable connecting device for connecting a first mechanism and a second mechanism to each other, the first mechanism being disposed within a seatback of a vehicle seat, and the second mechanism being disposed within a headrest positioned on an upper side of the seatback, the connecting device comprising;
    a first cable coupled to the first mechanism;
    a second cable coupled to the second mechanism;
    wherein the first cable includes a linear inner member and a tubular outer member, the inner member being inserted into the outer member and capable of moving relative to the outer member in an axial direction;
    a tubular support disposed on an upper side of the seatback;
    wherein the second cable includes a linear inner member housed within a tubular stay, the inner member being inserted into the tubular stay and capable of moving relative to the tubular stay in an axial direction;
    the tubular stay extending downward from the headrest and capable of being inserted into the support;
    wherein the inner member of the first cable has a connecting end with an engaging projection extending radially outward;
    wherein the support includes an insertion slot permitting the engaging projection to extend radially outward through the insertion slot and to move in an axial direction along the insertion slot;
    wherein the stay has a connecting end including a receiving slot capable of receiving the engaging projection in the axial direction;
    wherein the inner member of the first cable can be connected to the stay by (a) inserting the first cable into the support from the lower side, engaging the engaging projection of the inner member with the insertion slot of the support, and positioning the engaging projection at a terminal end of the insertion slot, so that the first cable is held by the support in a suspended manner within the support; and (b) inserting the stay into the support from the upper side for receiving the outer member of the first cable within the stay, so that (i) the engaging projection positioned at the terminal end of the insertion slot of the support is transferred to move into the receiving slot formed in the stay, (ii) the inner member of the first cable is connected to the stay via the engaging projection so as to be capable of moving relative to the stay within a predetermined distance in the axial direction, and (iii) an upper end of the outer member of the first cable is positioned to be proximal to a lower end of the inner member of the second cable;
    wherein when the first cable is held by the support in a suspended manner within the support, the upper end of the outer member of the first cable extends upward from an upper surface of the support; and
    a view window formed in a circumferential wall of the stay and positioned to be opposed to the lower end of the inner member of the second cable, so that the inside of the stay can be viewed through the view window.

2. The cable connecting device as in claim 1, wherein the view window is positioned to enable the upper end of the outer member of the first cable and the lower end of the inner member of the second cable to be viewed through the view window during the insertion of the stay into the support.

3. The cable connecting device as in claim 1, wherein the view window is positioned substantially completely within the support when the stay has been inserted into the support to reach a predetermined inserting position.

4. The cable connecting device as in claim 1, wherein:
    the insertion slot of the support has a configuration curved in a first direction with respect to a circumferential direction;

the receiving slot of the stay has a configuration curved in a second direction opposite to the first direction;

the engaging projection provided at the connecting end of the inner member of the first cable is transferred from the terminal end of the insertion slot of the support to the receiving slot formed in the stay and moves to a terminal end of the receiving slot as the outer member of the first cable rotates in the second direction;

a mark enabling recognition of change of condition is provided on an outer surface of the upper end of the outer member of the first cable; and the mark moves to be opposed to the view window as the engaging projection is transferred and moved from the terminal end of the insertion slot to the terminal end of the receiving slot.

5. The cable connecting device as in claim 1, wherein:

the insertion slot of the support has a configuration curved in a first direction with respect to a circumferential direction;

the receiving slot of the stay has a configuration curved in a second direction opposite to the first direction;

the engaging projection provided at the connecting end of the inner member of the first cable is transferred from the terminal end of the insertion slot of the support to the receiving slot formed in the stay and moves to a terminal end of the receiving slot as the outer member of the first cable rotates in the second direction;

a mark enabling recognition of change of condition is provided on an outer surface of the upper end of the outer member of the first cable; and the mark moves not to be opposed to the view window as the engaging projection is transferred and moved from the terminal end of the insertion slot to the terminal end of the receiving slot.

6. A cable connecting device comprising:

a first cable and a second cable coupled to a first mechanism and a second mechanism of a vehicle seat, respectively, so that actuation of the first mechanism results in moving the first cable to operatively move the second cable to actuate the second mechanism, each of the first and second cables having an inner cable member and an outer cable member;

a receiving member that receives end portions of the first cable and the second cable;

a coupling mechanism that couples the inner cable member of the first cable and the outer cable member of the second cable to each other within the receiving member; and a recognition enabling device provided on the second cable and that enables recognition that the inner cable member of the first cable and the outer cable member of the second cable are coupled to each other by the coupling mechanism.

7. The cable connecting device as in claim 6, wherein the recognition enabling device comprises a view window formed in the outer cable member of the second cable.

8. The cable connecting device as in claim 7, wherein the view window permits visual recognition of an upper end of the outer cable member of the first cable.

9. The cable connecting device as in claim 8, wherein the view window further permits visual recognition of a lower end of the inner cable member of the second cable.

10. The cable connecting device as in claim 8, wherein the first cable rotates relative to the receiving member during the operation for coupling by the coupling mechanism, and the recognition enabling device further comprises a mark provided on the upper end of the outer cable member of the first cable.

11. The cable connecting device as in claim 7, wherein the inner cable member of the first cable and the outer cable member of the second cable are coupled to each other by the coupling mechanism as the end portions of the first cable and the second cable are inserted into the receiving member, and wherein the view window is positioned inside of the receiving member when the coupling operation has been completed.

12. The cable connecting device as in claim 6, wherein the first mechanism is disposed within a seatback of the vehicle seat and the second mechanism is disposed within a headrest of the vehicle seat.

13. The cable connecting device as in claim 12, wherein the first mechanism is a detection device for detecting when backside collision occurs to a vehicle having the vehicle seat and the second mechanism is an actuator for moving the headrest in response to the occurrence of the backside collision.

* * * * *